United States Patent
Wada

(10) Patent No.: US 6,609,979 B1
(45) Date of Patent: Aug. 26, 2003

(54) PERFORMANCE APPRAISAL AND PRACTICE GAME SYSTEM AND COMPUTER-READABLE STORAGE MEDIUM STORING A PROGRAM FOR EXECUTING THE GAME SYSTEM

(75) Inventor: Toshifumi Wada, Tokyo (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/339,753

(22) Filed: Jun. 24, 1999

(30) Foreign Application Priority Data

Jul. 1, 1998 (JP) .......................... P10-186578

(51) Int. Cl.[7] ................................. A63F 9/24
(52) U.S. Cl. .................. 463/43; 463/30; 434/307 R
(58) Field of Search ................ 463/1, 35, 45, 463/7, 36, 37, 43; 273/148 B; 434/118, 156, 219, 227, 307 R, 308; 984/200, 302, 303; 84/470 R, 477 R, 609

(56) References Cited

U.S. PATENT DOCUMENTS

| | | | |
|---|---|---|---|
| 4,694,723 A |   | 9/1987 | Shinohara et al. |
| 5,092,216 A |   | 3/1992 | Wadhams |
| 5,270,475 A |   | 12/1993 | Weiss et al. |
| 5,331,417 A | * | 7/1994 | Soohoo ...................... 348/584 |
| 5,388,197 A | * | 2/1995 | Rayner ....................... 395/154 |
| 5,429,513 A | * | 7/1995 | Diaz-Plaza .................. 434/167 |
| 5,563,358 A | * | 10/1996 | Zimmerman .............. 84/477 R |
| 5,613,909 A | * | 3/1997 | Stelovsky ...................... 463/1 |
| 5,690,496 A | * | 11/1997 | Kennedy ................ 434/307 R |
| 5,756,915 A | * | 5/1998 | Matsuda .................... 84/602 |
| 5,782,692 A | * | 7/1998 | Stelovsky ...................... 463/1 |
| 5,918,223 A | * | 6/1999 | Blum et al. ..................... 701/1 |
| 5,931,680 A | * | 8/1999 | Semba .................... 434/307 A |
| 5,990,406 A | * | 11/1999 | Nakamura et al. ............. 84/609 |
| 6,018,121 A | * | 1/2000 | Devecka ....................... 84/743 |
| 6,051,770 A | * | 4/2000 | Milburn et al. ................ 84/611 |
| 6,072,113 A | * | 6/2000 | Tohgi et al. .............. 84/470 R |

FOREIGN PATENT DOCUMENTS

EP          0903169          3/1999

OTHER PUBLICATIONS

'PARAPPA THE RAPPER', www.scea/games/categories/stratpuzzel/parappa/story.html, Nov. 1997, Sony Computer Entertainment America, Inc,, all pages.*

* cited by examiner

Primary Examiner—Mark Sager
Assistant Examiner—Steven Ashburn
(74) Attorney, Agent, or Firm—Jordan and Hamburg LLP

(57) ABSTRACT

A game system comprises a storage device which stores data for reproducing music and data which define a performing procedure corresponding to the music, an operation input device for receiving an operation of a player, a reproduction device for reproducing the music based on the data for reproducing the music, and a performing operation instructing device for instructing the player to do performing operations associated with reproduction of the music onto the operation input device based on the data which define the performing procedure. The system further comprises a practice range setting device for setting a practice range on at least one portion of the music according to an instruction from the player, and a practice instructing device for instructing the player to practice the performing operations included in the practice range based on data corresponding to the practice range set through the practice range setting device in the data which define the performing procedure. Therefore, the player can set the practice range in a desired portion of the music to intensively practice the performing operations corresponding thereto.

9 Claims, 27 Drawing Sheets

FIG. 6

| | PLAY SELECT | |
|---|---|---|
| | BGM CODE | |
| | FREE-PLAY OPTION | |
| TRAINNING OPTION | PLAYER | |
| | STARTING POINT PHRASE NUMBER | |
| | END POINT PHRASE NUMBER | |
| | REPEAT | |
| | BLANK TIME | |
| | SPEED | |
| | BGM ON/OFF | |
| | CHECK MARK ON/OFF | |
| | RECORDING ON/OFF | |

FIG. 26

|       | PHRASE1        | PHRASE2         | PHRASE3         |
|-------|----------------|-----------------|-----------------|
| KEY A | SOUND EFFECT 1 | SOUND EFFECT 11 | SOUND EFFECT 1  |
| KEY B | SOUND EFFECT 2 | SOUND EFFECT 12 | SOUND EFFECT 2  |
| KEY C | SOUND EFFECT 3 | SOUND EFFECT 13 | SOUND EFFECT 3  |
| KEY D | SOUND EFFECT 4 | SOUND EFFECT 14 | SOUND EFFECT 4  |
| KEY E | SOUND EFFECT 5 | SOUND EFFECT 15 | SOUND EFFECT 5  |
| TABLE | SOUND EFFECT 6 | SOUND EFFECT 16 | SOUND EFFECT 16 |

PERFORMANCE APPRAISAL AND PRACTICE GAME SYSTEM AND COMPUTER-READABLE STORAGE MEDIUM STORING A PROGRAM FOR EXECUTING THE GAME SYSTEM

BACKGROUND OF THE INVENTION

1. Field of the Invention

The present invention relates to a video game system constituted in order to enjoy an operation in time with music.

2. Description of Relevant Art

There are commercially available game systems which can be played by a game player to add sound effects such as DJ (Disc Jockey) sounds or an ad-lib musical performance to music that is performed as BGM (background music), so that the game player can enjoy a performance of the music. For example, reference should be made to the music simulation game "Hiphopmania" manufactured and sold by Konami Co., Ltd.

In order to improve a musical performance technique, it is necessary to repeat practice of the same piece of music, and particularly it is important to repeatedly practice a hard portion of the music. There is no exception in this point even for the above-mentioned game systems. Therefore, it should be examined to provide a practice mode which is suitable for a player.

However, in the conventional game systems, only a mode where degree of difficulty is set to especially low, or a mode for displaying suitable advice during a game is provided for practice to allow the player to understand a method for progressing a game, a rule or an operating method thereof. Such practice modes do not serve the purpose of repeatedly practicing one piece of music.

SUMMARY OF THE INVENTION

The present invention has been achieved with such points in view. It therefore is an object of the invention particularly to provide a game system which variously facilitates a repetitive practice of one piece of music.

In order to achieve the above object, a first aspect of the present invention provides a game system comprising: a storage device which stores data for reproducing music and data which define a performing procedure corresponding to the music; an operation input device for receiving an operation of a player; a reproduction device for reproducing the music based on the data for reproducing the music; a performing operation instructing device for instructing the player to do performing operations associated with reproduction of the music onto the operation input device based on the data which define the performing procedure; a practice range setting device for setting a practice range on at least one portion of the music according to an instruction from the player; and a practice instructing device for instructing the player to practice the performing operations included in the practice range based on data corresponding to the practice range set through the practice range setting device in the data which define the performing procedure.

According to the first aspect, it is possible to set the practice range in one portion of the music so that the performing operations included in this range can be practiced. Therefore, the invention is convenient when the game player wishes to intensively practice a hard portion of the music or the like.

The game system may comprise a repetition setting device for setting as to whether or not a sequence of the performing operations included in the practice range is to be repeatedly practiced, and when a repetition of the sequence of the performing operations is set, the practice instructing device repeatedly may instruct the sequence of the performing operations corresponding to the practice range. In this case, since the performing operations relating to the practice range are instructed repeatedly, a desired portion of the piece of music can be practiced repeatedly.

The game system may comprise a blank setting device for setting blank time in case that the sequence of the performing operations included in the practice range is repeatedly instructed, and the practice instructing device may change an interval from an end of each sequence of the performing operations to a start of a next sequence of the performing operations based on the blank time set by the blank set device. In this case, the time interval when the practice is repeated can be adjusted according to player's preference.

The game system may comprise a tempo setting device for setting a tempo with which the practice instructing device instructs the performance operations in accordance with an instruction from a player, and the practice instructing device may change the tempo with which the performing operations are instructed based on a set result by the tempo setting device. According to this configuration, various kinds of practices can be made. For example, the player can practice a hard portion of the music with checking the performing operations one by one by reducing the tempo thereof, and also can increase the tempo of an easy portion to obtain a higher technique.

The practice instructing device may instruct the performing operations with the tempo which is more slow than a tempo with which the performing operation instructing device instructs the performing operations. Therefore, as mentioned above, the player can practice with checking the performing operations one by one.

The game system may comprise an operation recording device for recording the performing operations inputted through the operation input device by the player in response to an instruction of the practice instructing device; and a replay device for replaying the recorded performing operations. According to this configuration, the practice state is reproduced so that the player can make a check as to whether the practice is good or bad.

The game system may comprise an appraisal device for appraising as to whether each of the performing operations is good or bad every time the player performs a performing operation based on a correspondence relationship between the performing operations inputted through the operation input device by the player in response to the instruction of the practice instructing device and the data which define the performing procedure; and an appraisal display device for displaying appraised results by the appraisal device to the player. In this case, the player can refer to the displayed appraisals to check as to whether each performing operation is good or bad.

The game system may comprise an appraisal device for appraising as to whether each of the performing operations is good or bad every time the player performs a performing operation based on a correspondence relationship between the performing operations inputted through the operation input device by the player in response to the instruction of the practice instructing device and the data which define the performing procedure; an operation recording device for recording the performing operations inputted through the operation input device by the player in response to the instruction of the practice instructing device, and appraised results of the performing operations by the appraisal device; and a replay device for replaying the recorded performing operations together with the appraised results thereto. According to this arrangement, since the performing operations can be reproduced together with the appraisals given thereto, the practice result can be checked more objectively.

The appraisal device may be constituted so as to appraise each of the performing operations into plural levels, and said game system may be provided with a detection device for searching data of the performing operations recorded by the operation recording device so as to detect a portion to which an appraisal of certain level is given. According to this arrangement, a portion to which the appraisal of the certain level is given is searched from the recorded performing operations and a position thereof in the music can be specified. Therefore, a portion to which a bad appraisal is given is searched for and this portion is practiced intensively. On the contrary, a portion to which a good appraisal is given is searched for and a degree of improvement of the performing operations can be checked.

The game system may comprise a reproduction setting device for setting as to whether or not the music is to be reproduced by the reproduction device according to an instruction from the player; and a reproduction halt device for halting reproduction of the music while the practice instructing device instructs the performing operations, when the reproduction of the music is negated by the reproduction setting device. According to this configuration, the reproduction of the music can be halted during the practice. When the reproduction of the music is halted, the tempo of the practice can be set without a restriction by the reproduction speed of the music.

The game system may comprise an indicator to which at least one track extending in a predetermined direction is provided, and the performing operation instructing device and the practice instructing device may display instruction marks, each of which is provided for showing operation timing of the operation input device, in the indicator based on the data which define the performing procedure in such a manner that each of the instruction marks moves along the track and reaches an operating position fixed to be set to a constant portion of the track.

According to this configuration, it is possible to provide a simple and plain operating method such that the player has only to do the performing operations according to timing when each of the instruction marks which moves within the indicator reaches the operating position. Since the operating position is fixed to a constant part of the track, it is not necessary for the player to always observe each moving indication mark.

In order to achieve the above object, a second aspect of the present invention provides a game system comprising: a storage device which stores data for reproducing music and data which define a performing procedure corresponding to the music; an operation input device for receiving an operation of a player; a reproduction range setting device for setting a reproduction range in at least one portion of the music according to an instruction from the player; an instructing device for instructing the player to do performing operations included in the reproduction range based on data corresponding to the reproduction range set by the reproduction range setting device in the data which define the performing procedure; and a tempo setting device for setting a tempo with which the instructing device instructs the performing operations in accordance with an instruction from the player, wherein the instructing device changes the tempo with which the performing operations are instructed based on a set result by the tempo setting device.

According to the second aspect, the reproduction range can be set to one portion of the music, and the tempo in the range ,for example, is reduced so that the practice can be made while the performing operations are checked one by one.

In order to achieve the above object, a third aspect of the present invention provides a game system 13. A game system, comprising: a storage device for storing data for reproducing music and data which define a direction procedure of the music; an operation input device for receiving an operation of a player; a reproduction range setting device for setting a reproduction range in at least one portion of the music according to an instruction from the player; an instructing device for instructing the player to do the performing operations included in the reproduction range based on data corresponding to the reproduction range set by the reproduction range setting device in the data which define the performing procedure; an appraisal device for appraising as to whether each of the performing operations is good or bad every time the player performs a performing operation based on a correspondence relationship between the performing operations inputted through the operation input device by the player in response to an instruction from the instructing device and the data which define the performing procedure; an operation recording device for recording the performing operations inputted through the operation input device by the player in response to the instruction of the instructing device and appraised results of the performing operations by the appraisal device; and a replay device for replaying the recorded performing operations together with the appraised results thereto.

According to the third aspect, as described in the above, since the performing operations can be reproduced together with the appraisals given thereto, the player can appraise the performing operations more objectively.

According to a fourth aspect of the present invention, there is provided a storage medium which stores data for reproducing music, data which define a performing procedure corresponding to the music and a program for executing a predetermined music performance game based on the data, said data and program being readable by a computer, wherein said program is constituted to allow the computer to execute the steps of: setting a reproduction range in at least one portion of the music according to an instruction from a player; and instructing the player to do performing operations included in the reproduction range based on data corresponding to the set reproduction range in the data which define the performing procedure.

According to the fourth aspect, when the program and the data recorded on the storage medium are read by the computer, the game system which is suitable for the above first aspect can be provided.

According to a fifth aspect of the present invention, there is provided a storage medium which stores data for reproducing music, data which define a performing procedure corresponding to the music and a program for executing a predetermined music performance game based on the data, said data and program being readable by a computer, wherein said program is constituted to allow the computer to execute the steps of: setting a reproduction range in at least one portion of the music according to an instruction from a player; instructing the player to do performing operations included in the reproduction range based on data corresponding to the set reproduction range in the data which define the performing procedure; and setting a tempo with which the performing operations are instructed in accordance with an instruction from the player, an actual tempo with which the performing operations are practically instructed being changed based on the set tempo.

According to the fifth aspect, when the program and the data recorded on the storage medium are read by the computer, the game system which is suitable particularly for the second aspect can be provided.

According to sixth aspect of the present invention, there is provided a storage medium which stores data for reproducing music, data which define a performing procedure corresponding to the music and a program for executing a predetermined music performance game based on the data, said data and program being readable by a computer, wherein said program is constituted to allow the computer to execute the steps of: setting a reproduction range in at least one portion of the music according to an instruction from a player; instructing the player to do performing operations included in the reproduction range based on data corresponding to the set reproduction range in the data which define the performing procedure; appraising as to whether each of the performing operations is good or bad every time the player performs a performing operation based on a correspondence relationship between the performing operations inputted through an operation input device of a game system by the player in response to an instruction issued in said step of instructing and the data which define the performing procedure; recording the performing operations inputted by the player in response to the instruction issued in said step of instructing and appraised results given to each of the performing operations; and replaying the recorded performing operations together with the appraised results given to each of the performing operations.

According to the sixth aspect, when the program and the data recorded on the storage medium are read by the computer, the game system which is suitable particularly for the third aspect can be provided.

The nature, utility, and further features of the present invention will be more clearly apparent from the following detailed description with respect to preferred embodiment of the present invention when read in conjunction with the accompanying drawings.

BRIEF DESCRIPTION OF THE DRAWINGS

In the accompanying drawings:

FIG. 6 is a diagram showing summaries of data which are recorded in a main memory in order that training conditions are specified when a training mode is selected in the main routine of FIG. 5;

FIG. 26 is a diagram showing one example of a table where a relationship between operations on the controller and sound effects to be generated according to the operations is defined in the game system of FIG. 1.

DETAILED DESCRIPTION OF THE PREFERRED EMBODIMENT

Figure 1:
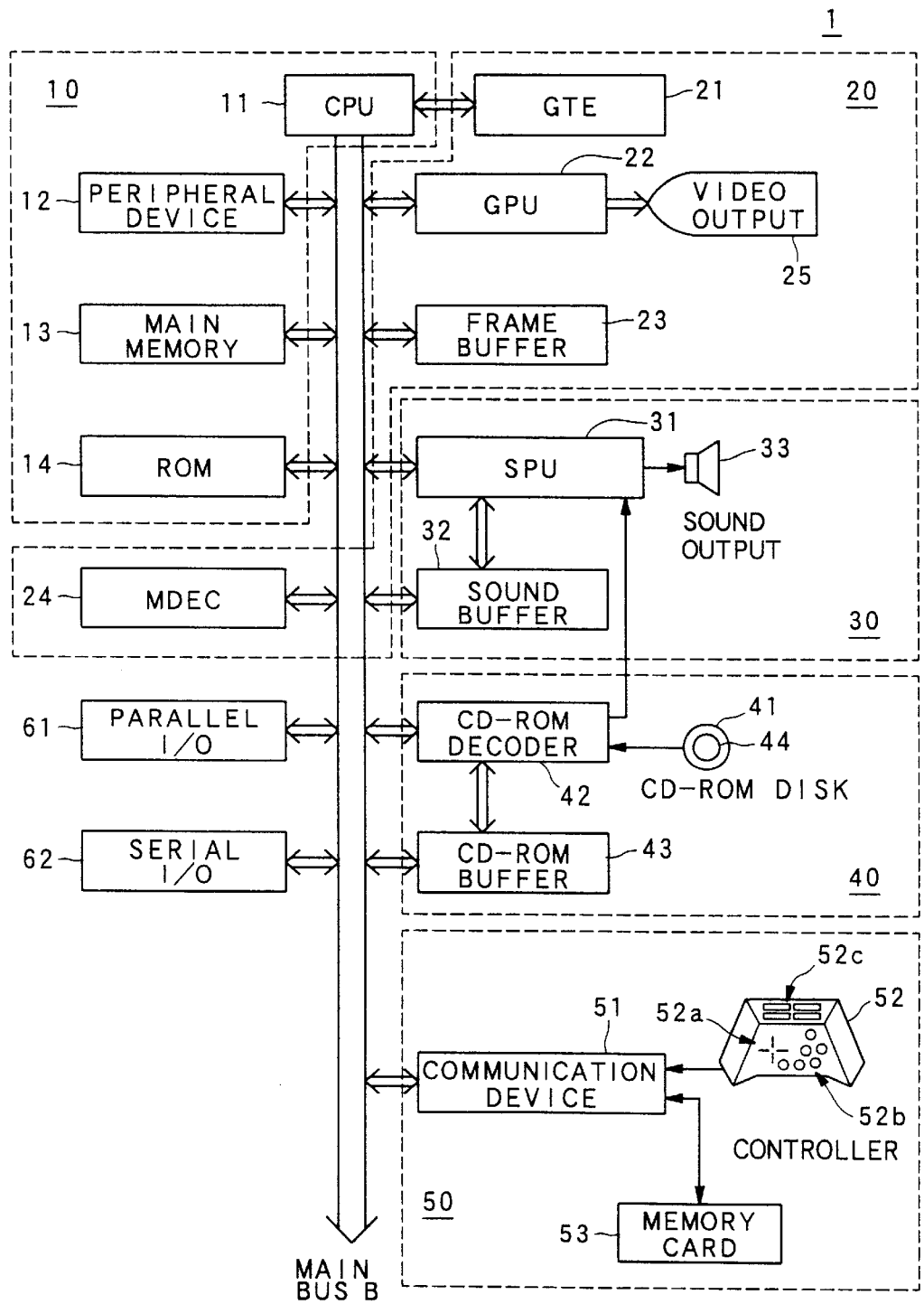
FIG. 1 is a block diagram of a home-use game machine according to an embodiment of the present invention.

FIG. 1 shows a home-use game system according to an embodiment of the present invention. A configuration shown in FIG. 1 is a general one employed by a home-use computer game machine, and its details are disclosed, for example, in Japanese Patent Application Laid-Open No. 8-212377.

A game system 1 of FIG. 1 has a main control section 10, a graphic control section 20, a sound control section 30, a disk reading section 40 and a communication control section 50. The respective sections 10 through 50 are electrically connected with each other by a main bus B. The main control section 10 has a CPU 11, which is mainly composed of a microprocessor, for executing various calculations and controls of the respective sections necessary for performing a game, a peripheral device 12 for executing interruption controls to the CPU 11 and auxiliary controls such as management of memory access and the like, a main memory 13 composed of a reloadable semiconductor storage device such as a RAM, and a ROM 14 for storing a program for controlling a basic operation of the game system 1.

The graphic control system 20 has a geometry transfer engine (GTE) 21 as a co-processor for executing specific calculations necessary for drawing images, for example coordinate calculations of polygons for drawing three dimensional images, in accordance with an instruction from the CPU 11, a graphics processing unit (GPU) 22 for executing a predetermined drawing process in accordance with the drawing instruction from the CPU 11, a frame buffer 23 which serves as means for temporarily storing data drawn by the GPU 22, and an image decoder (MDEC) 24 for decoding compressed image data stored in the main memory 13. During a game, image data recorded on a CD-ROM 44 as a storage medium are loaded into the main memory 13 in accordance with necessity thereto and decoded by the MDEC 24 so as to be drawn in the frame buffer 23 by the GPU 22. An arbitrary area in the image frame drawn in the frame buffer 23 is displayed on a monitor 25 as display means (for example, CRT of a home-use television image receiving machine).

The sound control section 30 has a sound processing unit (SPU) 31 for generating a musical sound, various sound effects and the like based on an instruction from the CPU 11, a sound buffer 32 having a capacity of, for example, 512 kilobytes for storing voice and musical sound data, sound source data and the like read from the CD-ROM 44, and a loudspeaker 33 as sound output means for outputting the musical sound, sound effects and the like generated by the SPU 31.

The SPU 31 has an ADPCM decoding function for reproducing voice data obtained by allowing voice data of 16 bits to undergo adaptive differential pulse code modulation (ADPCM) as a differential signal of 4 bits, a reproduction function for generating sound effects or the like by reproducing the sound source data stored in the sound buffer 32, a modulating function for modulating and reproducing the voice data or the like stored in the sound buffer 32, and the like. Namely, the SPU 31 contains ADPCE sound source which has a function for automatically converting an operation parameter by using looping and time as coefficients and has an ability of 24 voices, and it is actuated via the CPU 11. Moreover, the SPU 31 manages original address space mapped on the sound buffer 32 and transfers the ADPCM data from the CPU 11 to the sound buffer 32, and key-on/key-off and modulation information are directly transmitted to the SPU 31, so that the SPU 31 can reproduce the data.

The sound control section 30 having such functions can be used as so-called sampling sound sources for generating the musical sound, sound effects and the like based on voice data or the like recorded on the sound buffer 32 in accordance with the instruction from the CPU 11.

The disk reading section 40 has a disk drive 41 for reproducing a program, data and the like recorded on the CD-ROM 44, a decoder 42 for decoding the program, data and the like which are recorded after, for example, error correcting codes (ECC) are added thereto, and a buffer 43 having a capacity of, for example, 32 kilobyte for temporarily storing the reproduced data from the disk drive 41. Namely, the disk reading section 40 is composed of members, such as the disk drive 41, the decoder 42 and the like, required for reading a disk. In this section, disk formats, for example a CD-DA, CD-ROM XA and the like can be supported. The decoder 42 serves also as a part of the sound control section 30.

As the voice data which are recorded on the disk and reproduced in the disk drive 41, there are the above-mentioned ADPCM data (ADPCM data and the like of CD-ROM XA) as well as so-called PCM data obtained through an analog-to-digital conversion of a voice signal. The voice data, as the ADPCM data, which are recorded, for example, in a manner of 4 bit data representing a difference of 16 bit digital data, are supplied to the SPU 31 after undergoing error correction and decoding in the decoder 42. And the supplied data undergo digital-to-analog conversion in the SPU 31, and then are used for driving the loudspeaker 33. Here, an audio output of the decoder 42 is temporarily inputted into the SPU 31 so as to be mixed with an SPU output, and the mixed output becomes a final audio output via a reverb unit.

The communication control section 50 has a communication control device 51 for controlling communication with the CPU 11 via the main bus B, a controller 52 as operation input means having a plurality of operation members (for example, pushbutton switches) operated by a game player, and a memory card (auxiliary storage medium) 53 mainly composed of a semiconductor device where reloading and storage are possible. The controller 52 is provided with a direction operating section 52a for instructing up-and-down and right-and-left directions, and selection operating sections 52b and 52c composed respectively of a plurality of pushbutton switches. Various functions are allocated to the operation members of the operating sections 52a through 52c according to a progress state and set state of a game. Signal representing the operation states of the operation members are outputted from the controller 52 in a constant period (for example, 60 times per second), and the output signals are transmitted to the CPU 11 via the communication control device 51. In FIG. 1, only a set of the controller 52 and the memory card 53 is shown, but a plurality of the controllers 52 and the memory cards 53 can be attached respectively to the communication control device 51.

Further, the game system 1 has a parallel I/O (Input/Output) port 61 and a serial I/O port 62 for connecting peripheral equipment. The serial I/O port 62 can be connected with another game system 1 via a communication cable, not shown, and this connection enables progress of a game while communication between the two game systems 1, 1.

When the CD-ROM 44 on which the program and data for executing a game according to the present invention are stored is set in the disk reading section 40 and a predetermined initializing operation (for example, turning-on of the electric power source or an operation of a reset switch (not shown)) are executed, the CPU 11 executes a predetermined music performance game according to the program on the CD-ROM 44. A summary of the music performance game is as follows. The BGM data recorded on the CD-ROM 44 are reproduced through the sound control section 30 and a game player is requested to do performing operations onto the controller 52 so as to follow a predetermined performing procedure associated with the BGM. Then, the sound effects corresponding to the performing operations of the player are superposed on the BGM sound so as to be outputted from the loudspeaker 33.

The BGM data are recorded on the CD-ROM 44 in a format of, for example, a CD-DA or CD-ROM XA. In these formats, respective pieces of music are fragmented per suitable data amount so as to be recorded. The fragmented data include information representing playing time of the data based on heads of the respective pieces of music (for example, time information of the channel Q of the CD standards). The game system of FIG. 1 can utilize the information representing the playing time so as to be capable of specifying lapsed time from the start of playing a specified piece of music and the system is capable of starting reproduction of the BGM from that time.

Figure 2:
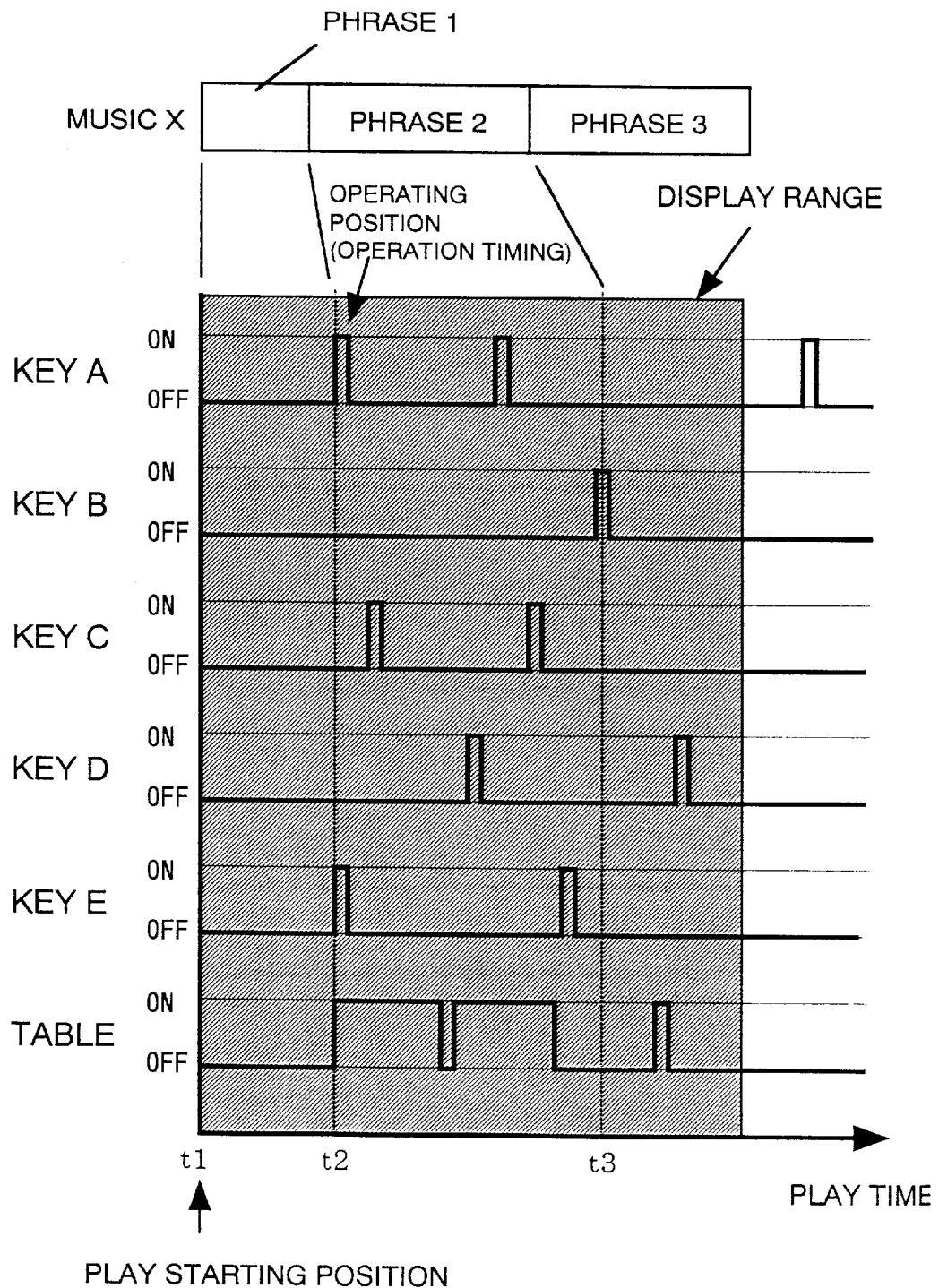
FIG. 2 is a diagram showing a relationship between BGM data recorded on a CD-ROM of FIG. 1 and score data recorded thereon so as to be associated with each other.

In addition, score data in which the performing procedure of the controller 52 for each piece of BGM is defined are also recorded on the CD-ROM 44. For example, FIG. 2 is a time chart showing score data corresponding to a piece of music X as the BGM recorded on the CD-ROM 44. In the score data, five keys A through E and one table are defined as the operation members of the controller 52 to be operated according to the piece of music X. On the occasion of creating the score data, a determination is first made as to positions in the music X where each of the keys A through E and the table is operated. Next, the determined operation positions are converted into the lapsed time from the head of the music X in accordance with a time axis (corresponding to a horizontal axis in the figure). The converted time is transformed into data to thereby be recorded on the CD-ROM 44. The music X as the BGM comprises a plurality of phrases, and delimiter time t1, t2, t3 . . . for each phrase are recorded on the score data so as to be associated with phrase numbers. As the phrase numbers, the first phrase is 1, and consecutive numbers are given to the phrases according to the order of playing. Further, information for specifying the sound effects to be generated at each operation position is also included in the score data. The data of the sound effects are recorded as sound effect data on the CD-ROM 44 separately from the score data and the BGM data, and information for specifying as to which sound effect is used in the respective operation positions of FIG. 2 is recorded on the score data.

Figure 3:
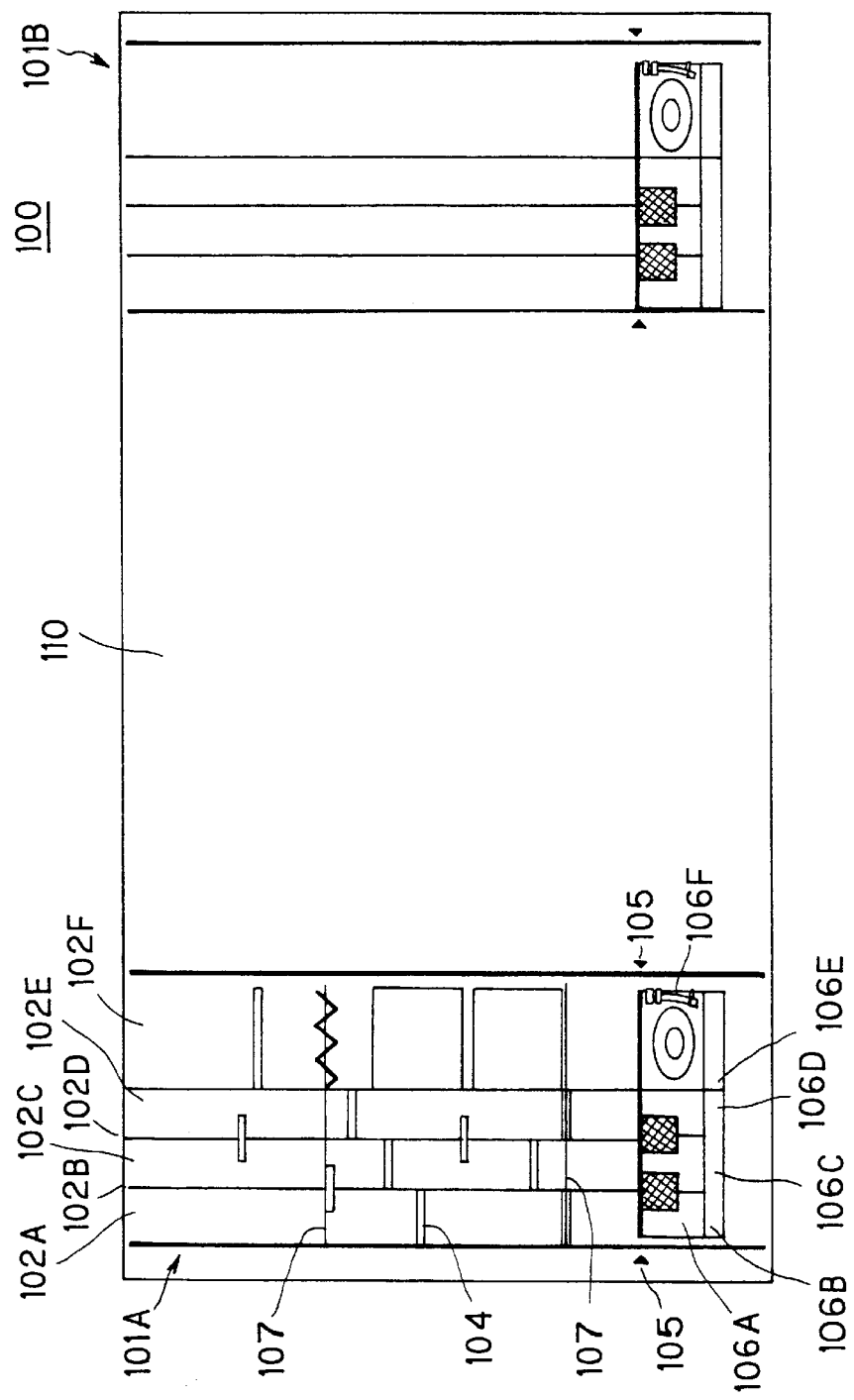
FIG. 3 is a diagram showing a basic game picture in a music performance game to be executed in the game system of FIG. 1.

FIG. 3 shows a basic game picture displayed in the music performance game to be executed according to the program of the CD-ROM 44. A game picture 100 includes a pair of indicators 101A and 101B for instructing operation timing of the controller 52 to the player, and a main display area 110 which is sandwiched between the indicators 101A and 101B. A pair of indicators 101A and 101B is provided because in the case where two players play a game simultaneously using the respective controllers 52, the operation timing can be instructed independently to the players. In the case where one player plays a game, only one of the indicators is used. For example, FIG. 3 shows a state that only the left indicator 101A is used and the right indicator 101B is not used. The right and left indicators 101A and 101B have the same constitution, so when it is not necessary to distinguish them from each other, they are represented as the indicator 101.

Figure 4:
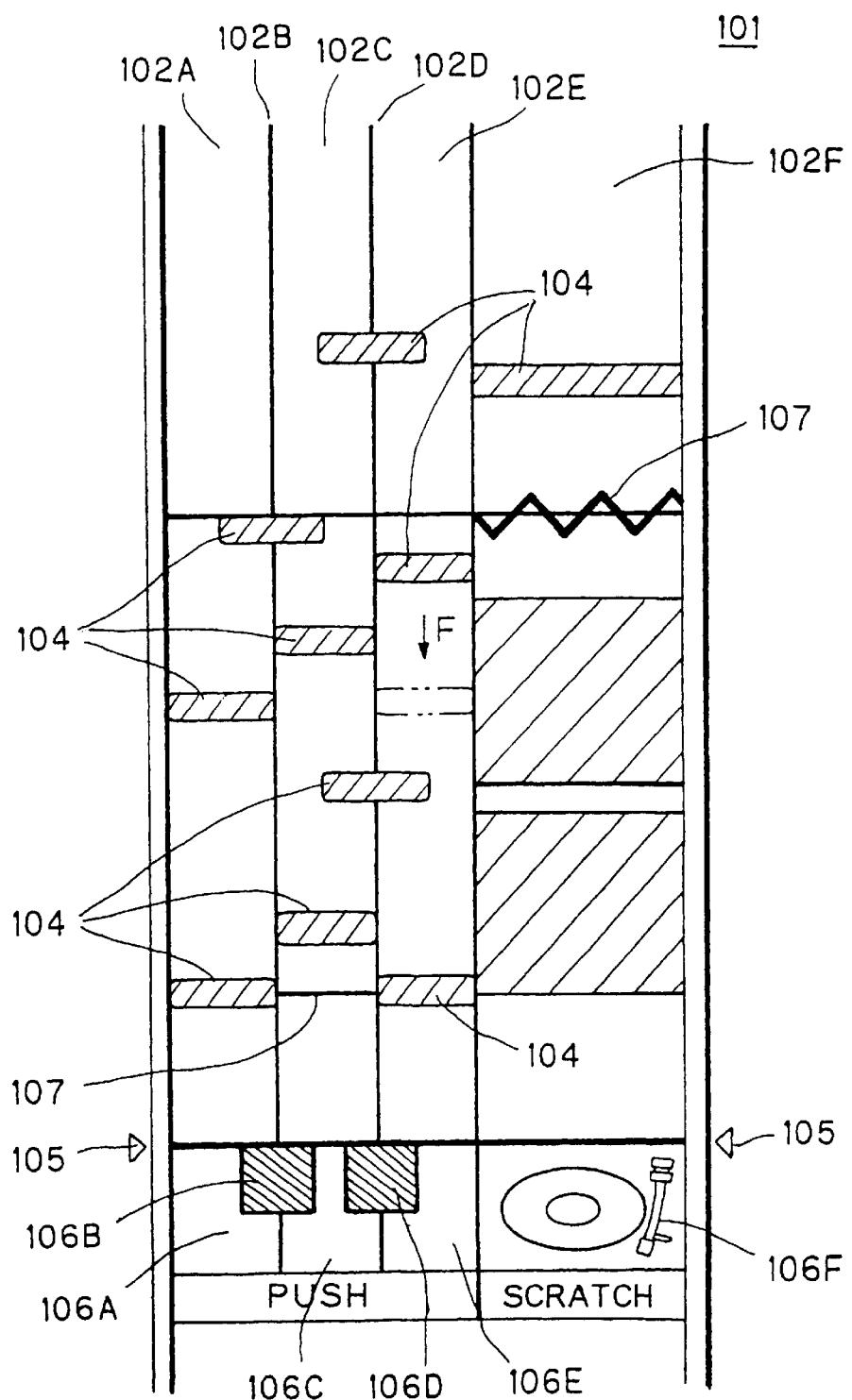
FIG. 4 is an enlarged view of an indicator to be displayed on both ends of the game picture of FIG. 3.

As shown in detail in FIG. 4, the indicator 101 is provided with six tracks 102A, 102B, 102C, 102D, 102E and 102F which extend in an up-and-down direction. The tracks 102B and 102D are defined on lines which divide the tracks 102A, 102C and 102E.

The tracks 102A through 102F are associated with the respective operation members on the controller 52, which are different from each other. For example, the track 102A is associated with the operation member of the direction operating section 52a, the tracks 102C, 102E and 102F are associated with the respective push-button switches of the selection operating section 52b, which are different from each other, and the tracks 102B and 102D are associated with the respective push-button switches of the selection operating section 52c, which are different from each other. The track 102F is used for instructing scratch play, that is, an operation for generating an unique sound effect which can be obtained by manually rotating a phonograph record on a turntable of an analog record player so as to scratch the phonograph record on a needle. Therefore, as the operation member which has correspondence to the track 102F, one which can remind the game player of a rotational operation of a phonograph record is desirable. For example, a joy stick type operation member which enables the rotating operation about 360° is added to the controller 52 of FIG. 1, and this operation member may have correspondence to the track 102F.

The keys A through E of the score data shown in FIG. 2 have one to one correspondence to the tracks 102A through 102E of the indicator 101, and the table F has correspondence to the track 102F. The correspondence relationship between the keys A through E and the tracks 102A through 102E may be changed.

On the tracks 102A through 102F, timing marks 104 . . . 104 for instructing the operation timing of the operation members of the controller 52 having correspondence to the tracks are displayed based on the score data of FIG. 2. Namely, when the game is executed, the CPU 11 reads data in a constant range from current time (lapsed time from the starting of playing) towards the future in the score data of FIG. 2 as a display range on the indicator 101. Then, while time axis of the score data is made to correspond to the vertical axis of the indicator 101 so that a start of the display range, which corresponds to the current time, comes to a position indicated by cursors 105, 105 at the lower end of the indicator 101 and an end of the display range comes to an upper end of the indicator 101, the timing marks 104 are displayed on positions on the tracks 102A through 102F corresponding to the operation timings included in the display range. Further, in the case where the delimiters of the phrases are included in the score data, the CPU 11 displays delimiter lines. 107 representing the delimiters of the phrases on the indicator 101.

When the CPU 11 repeats the above process in a suitable cycle, the timing marks 104 gradually move downward on the tracks 102A through 102F as represented by an arrow F in FIG. 3 (see an imaginary line displayed on the track 102E). When the timing marks 104 reach the operation position represented by the cursors 105, 105 at the lower end of the tracks 102A through 102F, the operating time of the performing operation has just come with respect to the operation members of the controller 52, which have correspondence to the tracks 102A through 102F on which the reached timing marks 104 are displayed. When the player does the performing operation onto the suitable operation member according to the instructed timing, the suitable sound effect is superposed on the BGM. Data for generating the sound effects are recorded on the CD-ROM 44 in advance. Data representing a relationship between the operations of the controller 52 and the sound effects generated correspondingly are also stored on the CD-ROM 44. The above data are loaded into the main memory 13 as the need arises. FIG. 26 shows one example of a table which is created in the main memory 13 based on the data in the CD-ROM 44 when the sound effects are changed per phrase. In the table, the sound effects to be generated per phrase are allocated individually to the keys A through E and the table F.

Icons 106A, 106C and 106E imitating a white key of a keyboard instrument are displayed on the lower ends of the tracks 102A, 102C and 102E, and icons 106B and 106D imitating a black key are displayed on the lower ends of the tracks 102B and 102D. Further, an icon 106F imitating an analog record player is displayed on the lower end of the track 102F.

Figure 5:
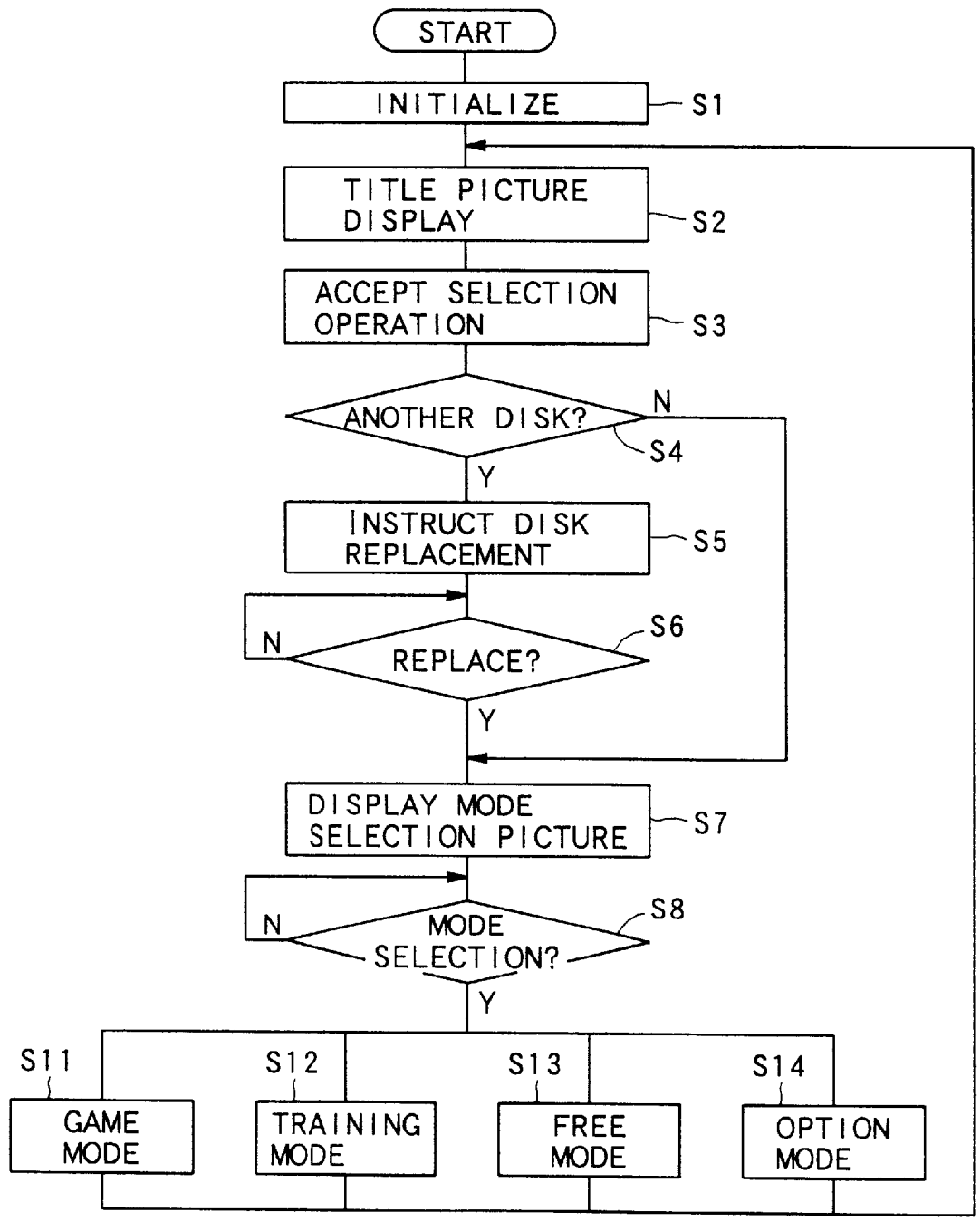
FIG. 5 is a flow chart showing a main routine to be executed in the game system of FIG. 1.

FIG. 5 is a flow chart showing a main routine executed by the CPU 11 when the aforementioned music performance game according to the program written in the CD-ROM 44 is performed. After necessary portions of the programs and the data written in the CD-ROM 44 are loaded into the main memory 13, the CPU 11 initializes various parameters according to the loaded program (step S1) and displays a predetermined title picture on the monitor 25 (step S2). Commands selectable by the player are displayed in a form of a menu on the title picture. The selectable commands include designation of an arcade mode for executing the game based on the data recorded on the CD-ROM 44, and designation of a mode for executing the game based on data on another CD-ROM (hereinafter, referred to as an appendix disk) provided separately from the CD-ROM 44.

The CD-ROM 44 and the appendix disk have different BGM data and score data corresponding to the BGM data. The program required for controlling the game is recorded on the CD-ROM 44, but such a program is not recorded on the appendix disk. Namely, the appendix disk serves as a storage medium on which the BGM data and score data, which cannot be recorded on the CD-ROM 44 due to a restriction on its capacity, are recorded.

After an operation of the controller 52 by the player is accepted at step S3, a judgment is made as to whether or not the player demands the game mode with the appendix disk (step S4). When the game mode with the appendix disk is requested, the disk replacement is requested to the player via the monitor 25 (step S5), and a judgment is made as to whether or not the disk is replaced based on a signal from the disk reading section 40 (step S7). When the disk is replaced, the sequence goes to step S7. When the judgment is made at step S4 that the appendix disk is not required, the steps S5 and S6 are omitted so that the sequence goes to step S7.

A mode selection picture is displayed on the monitor 25 at step S7. The mode selection picture shows the modes which can be selected by the player, and the selection can be made from the "game mode", the "training mode", the "free mode" and the "option mode".

A judgment is made at step S8 as to whether or not the player selects one of the modes via the controller 52. When it is determined that the player selects one of the modes, the selected mode is executed (step S10, S11, S12 or S13). When the selected mode is completed, the sequence returns to step S2.

The "game mode" at step S11 is a mode for playing the normal music performance game. Namely, in the "game mode", the BGM is outputted from the loudspeaker 33 through the disk reading section 40 and the sound control section 30, and the timing marks 104 are displayed in the indicator 101 (see FIGS. 3 and 4) according to the BGM. When the player operates the controller 52 according to the display in the indicator 101, the sound effect according to the operation is superposed on the BGM. As a result, the player can enjoy the performing, rendering, or directing operations associated with the music. Moreover, in the "game mode", when the player does the performing operations onto the controller 52 during the play of the BGM, each performing operation is compared with the score data so that an appraisal is made as to how faithfully the player has operated the controller 52 according to the score data. Scores of the game are competed with each other based on the appraisal.

The "training mode" at step S12 is provided for practicing a play in the "game mode". Now, detailed explanation of the "training mode" will be made below with reference to FIGS. 6 through 25. In the following process, various steps in which the player can select and determine desired items or give certain instructions are provided, but such selections and the like are inputted into the CPU 11 by means for operating controller 52 referring to pictures displayed on the monitor 25 similar to the case of the normal game system. Detailed description of their respective operating methods is omitted.

FIG. 6 shows a structure of data for defining training conditions to be recorded in the main memory 13 (hereinafter, referred to as training data). The training data include information relating to setting states of the "Play select", the "BGM code", the "Free-play option" and the "Training option". Further, the information of the "Training option" includes information relating to setting states of the "Player", "Starting point phrase number", "End point phrase number", "Repeat", "Blank time", "Speed", "BGM ON/OFF", "Check mark ON/OFF" and "Recording ON/OFF".

Figure 7:
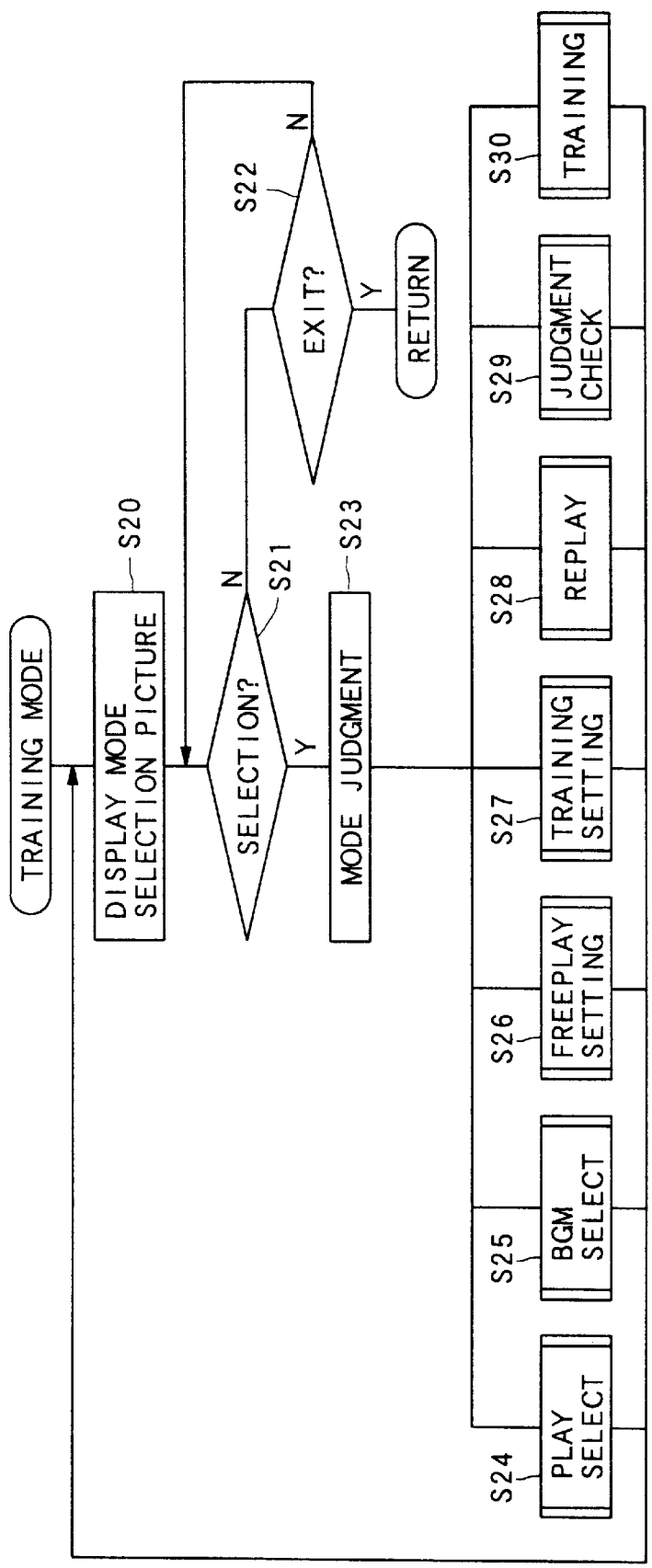
FIG. 7 is a flow chart showing processing steps in the case where the training mode is selected in the process of FIG. 5.
Figure 8:
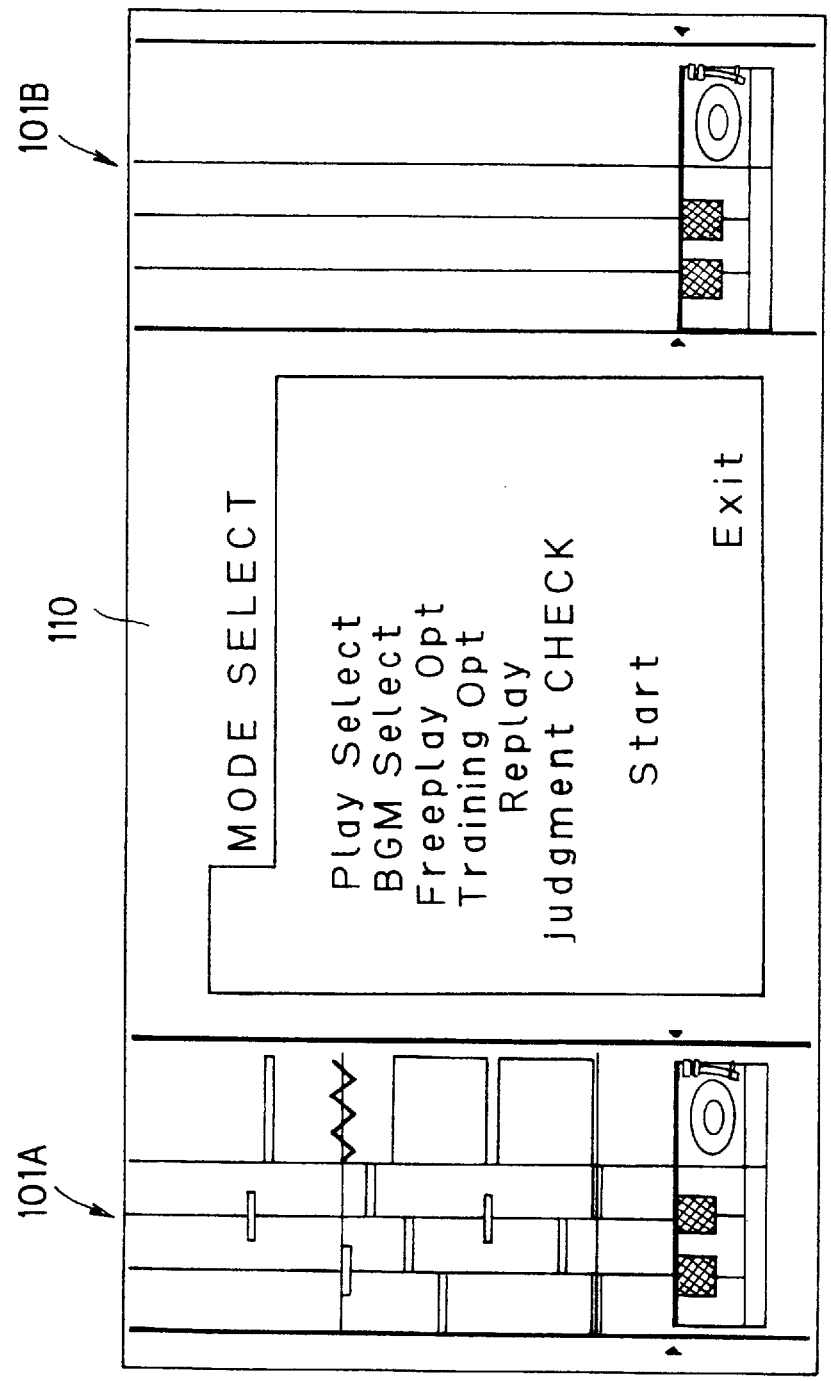
FIG. 8 is a diagram showing one example of a mode selection picture to be displayed on a monitor in the process of FIG. 7.

FIG. 7 is a flow chart showing a processing procedure of the CPU 11 in the training mode. When in the training mode, the CPU 11 first displays a mode selection picture on the monitor 25 (step S20). As shown in FIG. 8, the mode selection picture is configured in such a manner that a list of items which can be selected in the training mode is shown in the display area 110 of the game picture 100. Detail of the selection items will be mentioned later.

Next, a judgment is made as to whether or not the player selects one of the modes displayed on the mode selection picture (step S21), and when the player does not select a mode, a judgment is made as to whether or not the player instructs the end of the training mode through the controller 52 (step S22). When the end is instructed, the training mode is ended so that the sequence returns to step S2 of FIG. 5. When the end of the training mode is not instructed, the sequence returns to step S21.

In the case where the judgment is made at step S21 that one of the modes is selected, the selected mode is distinguished at next step S23. Then, process according to the selected mode is executed (steps S24 through S30). There will be described below the respective modes.

Figure 9:
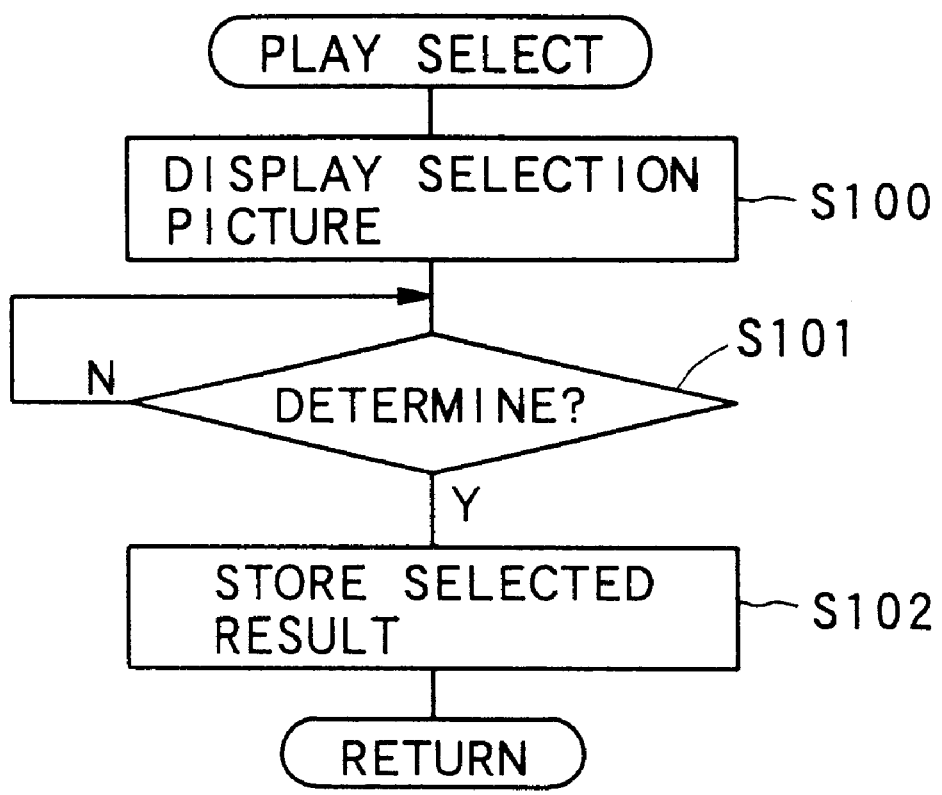
FIG. 9 is a flow chart showing processing steps in the case where play select setting is selected in the process of FIG. 7.
Figure 10:
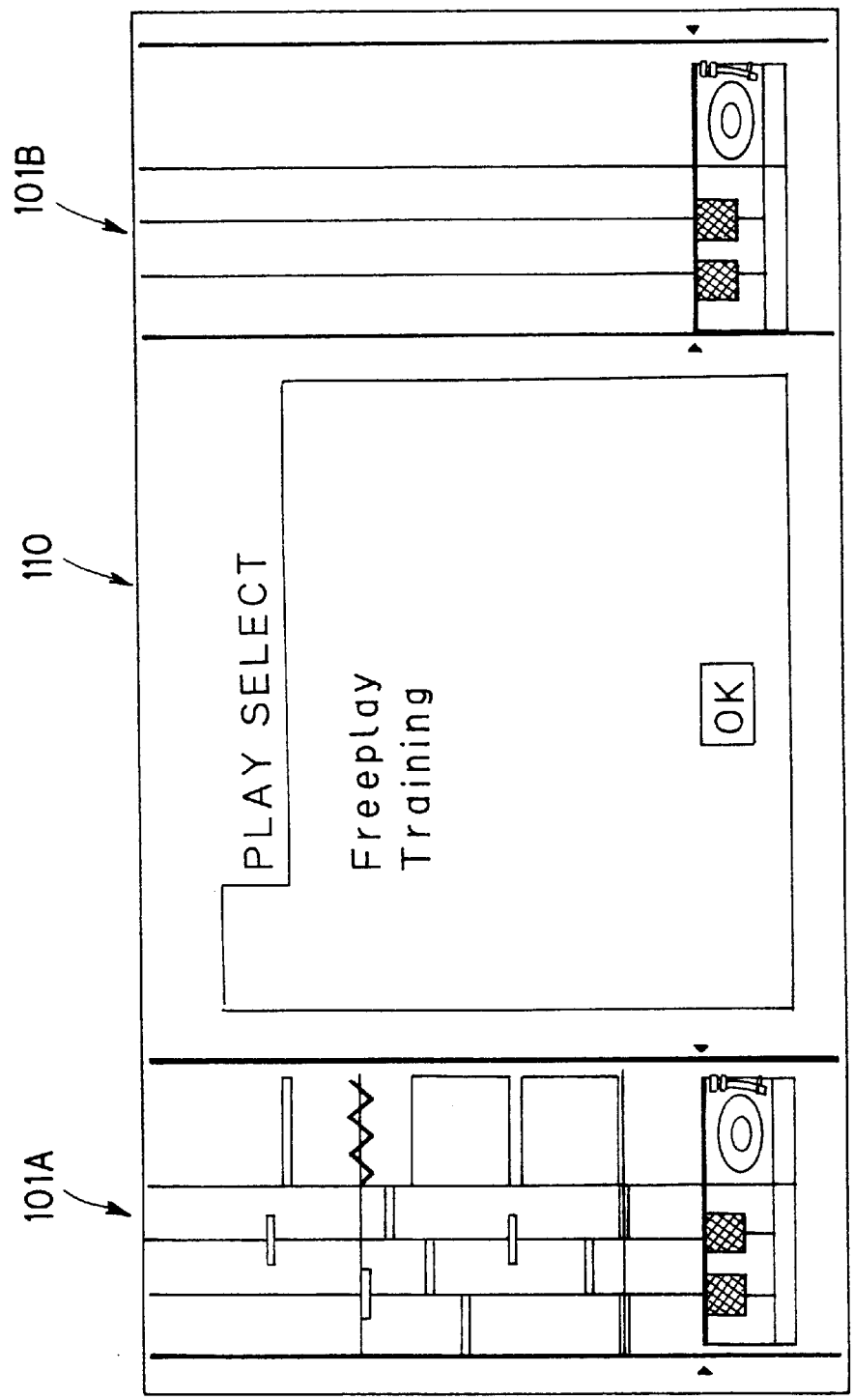
FIG. 10 is a diagram showing an example of a picture to be displayed in the case where the process of FIG. 9 is executed.

FIG. 9 shows details of a play select process (step S24 of FIG. 7). This process sets the item of the "Play select" of FIG. 6. Concretely, the process of FIG. 9 is executed for selecting a training method in the training mode between the "Free-play" for making a practice from head to tail of the BGM and the "Training" for making a practice in an arbitrarily selected portion of the BGM. When the play select process is selected, the CPU 11 first displays a play select picture on the monitor 25 (step S100). As shown in FIG. 10, the play select picture is constituted to show options of the "Free-play" and the "Training" on the main display area 110 of the game picture 100.

At next step S101, a judgment is made as to whether or not the player selects one of the modes of the "Free-play" and the "Training". When it is judged that the player selects one, the selected result is recorded in the main memory 13 (step S102). Thus, the information relating to the item of the "play select"in the data of FIG. 6 is updated. After the recording, the sequence returns to step S20 of FIG. 7.

Figure 11:
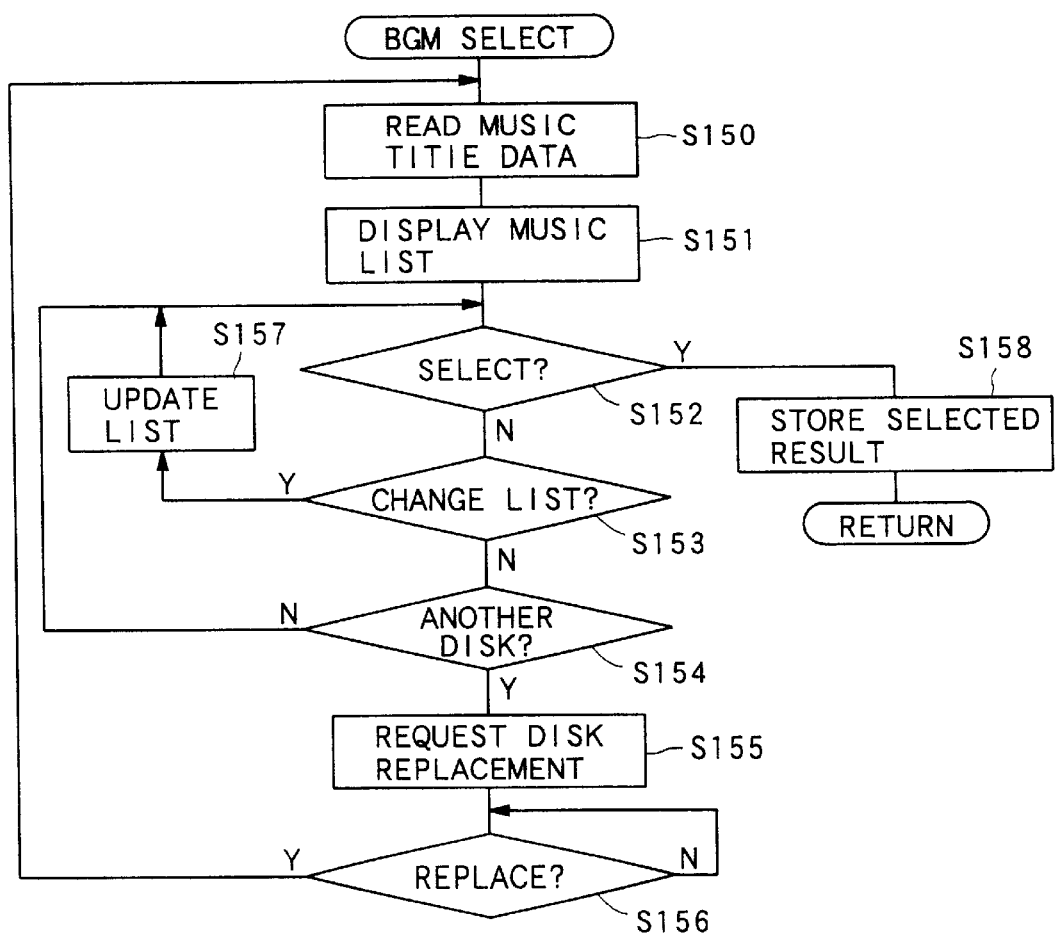
FIG. 11 is a flow chart showing processing steps in the case where BGM select setting is selected in the process of FIG. 7.
Figure 12:
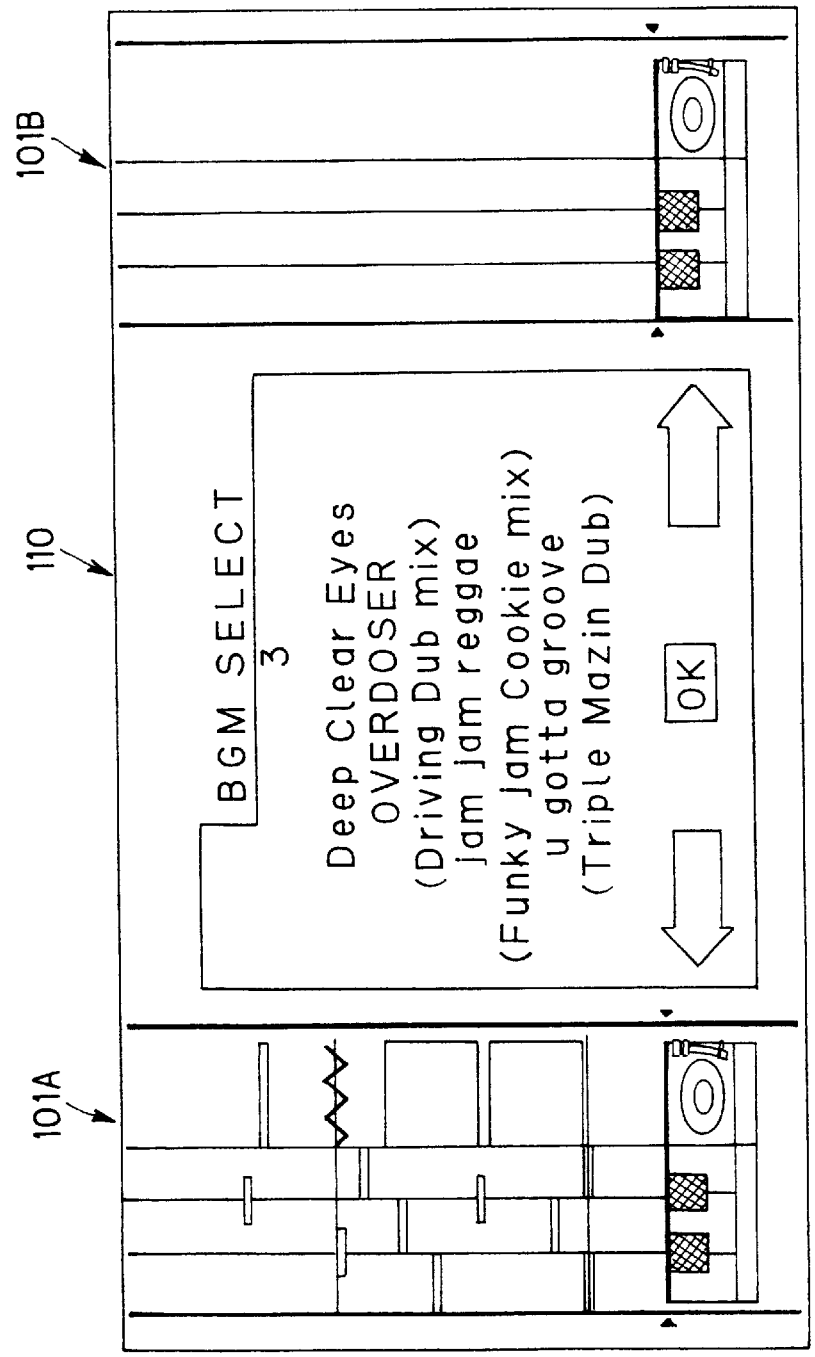
FIG. 12 is a diagram showing an example of a picture to be displayed in the case where the process of FIG. 11 is executed.

FIG. 11 shows details of a BGM select process (step S25 of FIG. 7). This process is executed in order to set the item of the "BGM code" of FIG. 6, in other words, to select the BGM to be practiced in the training mode. When the "BGM select" mode is selected, the CPU 11 first reads data of titles of the BGM which can be practiced from the CD-ROM 44 (step S150) and displays the titles thereof on the monitor 25 (step S151). The display is, as shown in FIG. 12 for example, carried out in such a manner that only a part of the selectable titles of the entire pieces of the music is displayed on the main display area 110 in the form of a list. This is because a space for displaying the entire tiles of the selectable pieces of the music (for example, 20 titles) cannot be secured in the main display area 110.

At next step S152, a judgment is made as to whether or not the player selects a desired piece of music from the list of the titles displayed on the screen. When it is determined that the player does not select any pieces of music, the sequence goes to step S153 so that a judgment is made as to whether or not the player instructs a change in the title list. This change means display of other titles of the music recorded on the same CD-ROM 44. When it is determined that the change in the title list is instructed, the CPU 11 updates the titles of the music to be displayed on the screen (step S157), and thereafter the sequence returns to step S152.

When it is determined at step S153 that the change in the title list is not instructed, the sequence goes to step S154 so that a judgment is made as to whether or not the player instructs a change to the appendix disk. This instruction means selection of the music recorded on another CD-ROM 44 (appendix disk) unlike the change in the title list. When the change into another disk is not instructed, the sequence returns to step S152, and when the change is instructed, the sequence goes to step S155. Note that, as to whether or not another disk is used, there is the other opportunity to make the selection in the processes of FIG. 5. Therefore, the process at step S154 may be omitted, if it is not necessary. At step S155, the player is requested through the monitor 25 to replace a disk, and a judgment is made as to whether or not the disk is replaced based on a signal from the disk reading section 40 (step S156). When the disk is replaced, the sequence returns to step S150. When it is determined at step S152 that the player determines the BGM, the sequence goes to step S158 so that a code defining the selected BGM is stored into the item of the "BGM codes" shown in FIG. 6, and the sequence returns to step S20 of FIG. 7.

Figure 13:
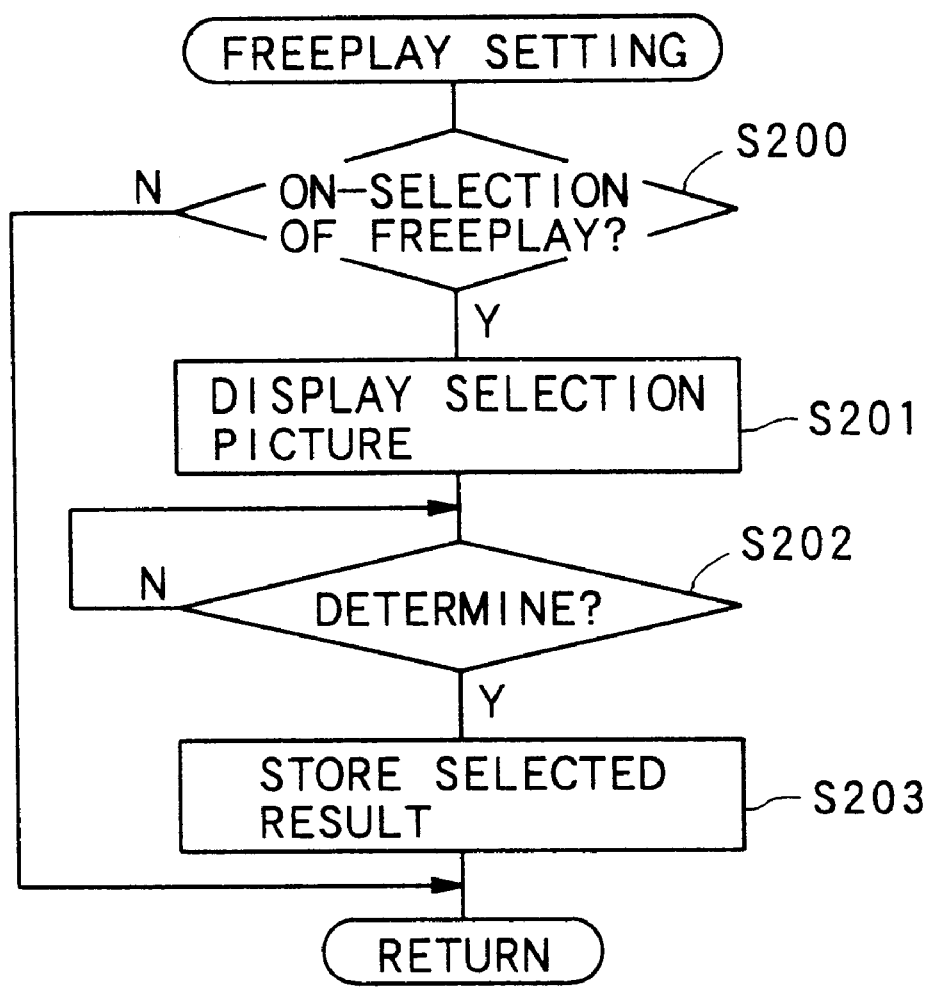
FIG. 13 is a flow chart showing processing steps in the case where free-play setting is selected in the process of FIG. 7.
Figure 14:
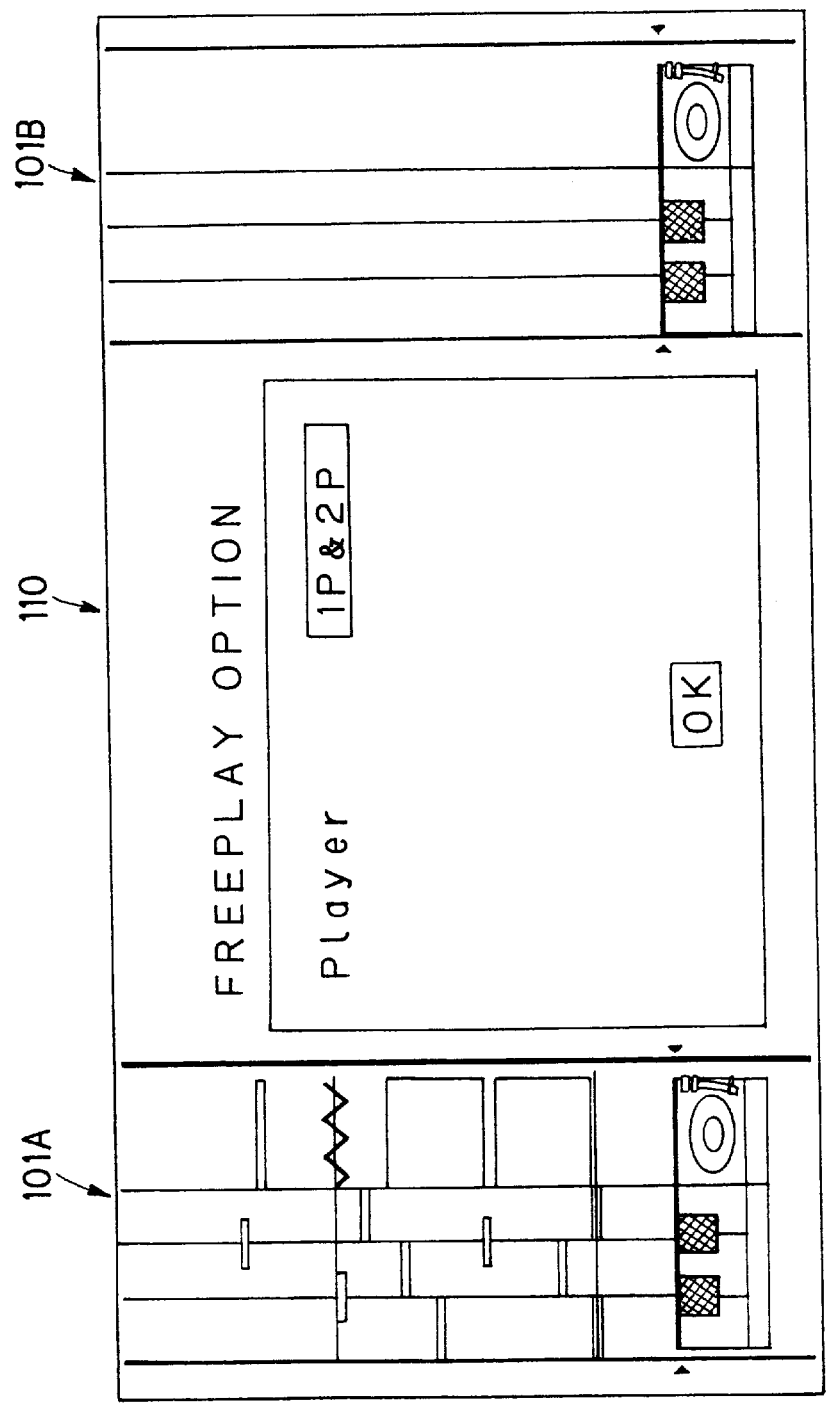
FIG. 14 is a diagram showing an example of a picture to be displayed in the case where the process of FIG. 13 is executed.

FIG. 13 shows details of a free-play setting process (step S26 of FIG. 7). This process is executed in order to set the item of the "Free-play option" of FIG. 6. When the free-play setting is selected, the CPU 11 first refers to the item of the "Play select" in the data of FIG. 6 recorded in the main memory 13 and judges as to whether or not the "Free-play" is currently selected (step S200). When the "Free-play" is selected, the sequence goes to step S201 so that a selection picture of the "Free-play option" is displayed on the monitor 25. As shown in FIG. 14, this selection picture is configured to show the items which can be selected as the "Free-play option" and the setting states for the respective items on the main display area 110 of the game picture 100. Incidentally, FIG. 14 is a display example in the case where a selection can be made as to whether the "Free-play" is performed by one player or two players.

At next step S202, a judgment is made as to whether or not the player determines the setting of the "Free-play option", and when determined, its result is recorded in the item of the "Free-play option" of FIG. 6 (step S203). Thereafter, the sequence returns to step S20 of FIG. 7. When it is determined at step S200 that the "Free-play" is not selected, the steps S201 through S203 are omitted so that the sequence returns to step S20 of FIG. 7.

Figure 15:
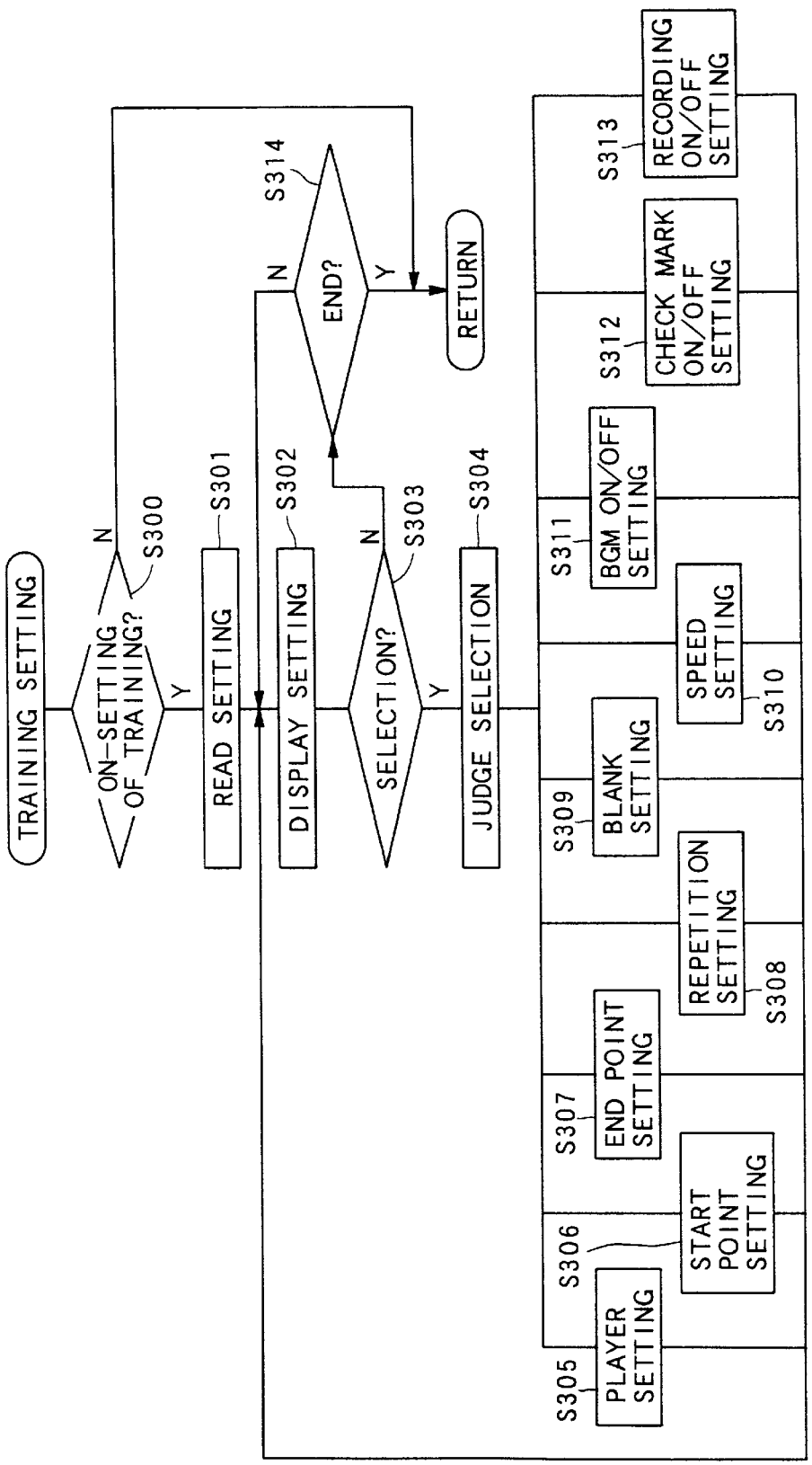
FIG. 15 is a flow chart showing processing steps in the case where training setting is selected in the process of FIG.
Figure 18:
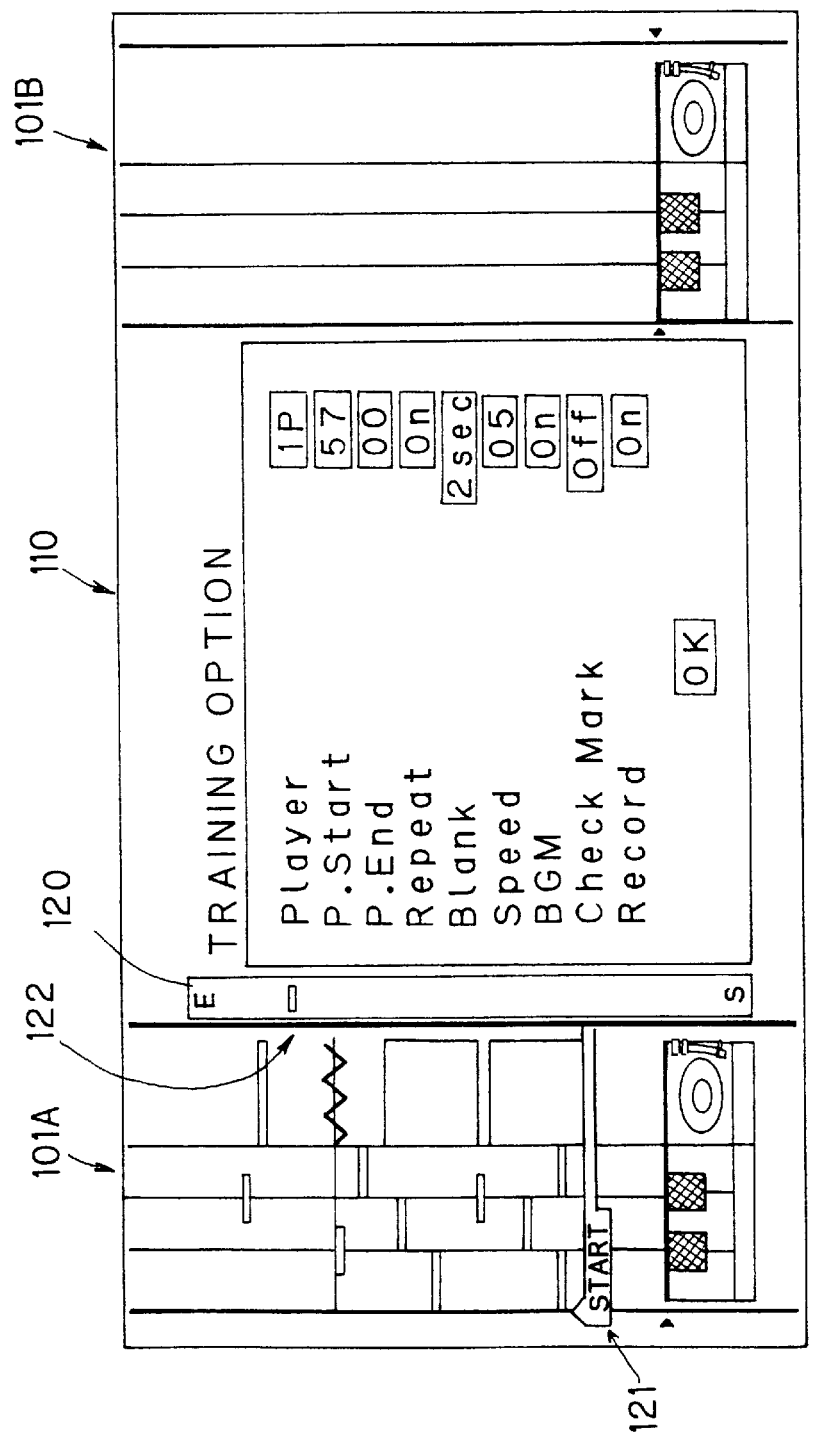
FIG. 18 is a diagram showing an example of a picture to be displayed in the case where the process of FIG. 16 is executed.
Figure 19:
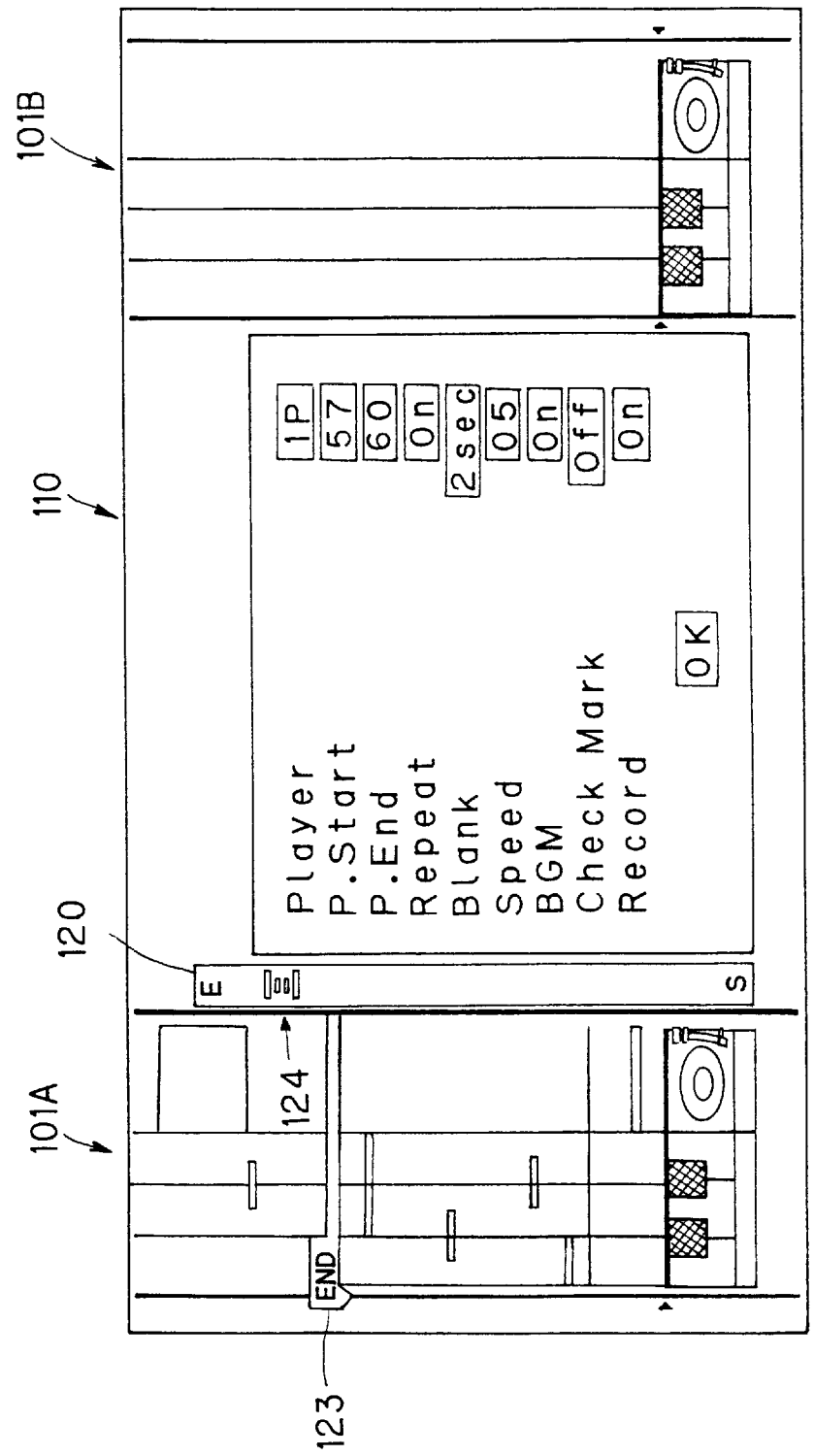
FIG. 19 is a diagram showing an example of a picture to be displayed in the case where the process of FIG. 17 is executed.

FIG. 15 shows details of a training setting process (step S27 of FIG. 7). This process is executed in order to set the items of the "Training option" of FIG. 6. At step S300, the "Play select" item in the data of FIG. 6 recorded in the main memory 13 is referred to thereby make a judgment as to whether or not the "Training" is currently selected. When the "Training" is selected, the sequence goes to step S301, and the setting state relating to the items of the "Training option" is read from the data of FIG. 6. Therefore, the read setting contents are displayed on the monitor 25. Examples of the display at this time are shown in FIGS. 18 and 19.

At next step S303, a judgment is made as to whether or not the player selects one of the items (see FIG. 6) which can be set as the "Training option" (step S303), and when the player selects one of them, the selected result is distinguished (step S304). Then, the process for setting the item according to the selected result is executed (steps S305 through S313). After the setting is completed, the sequence returns to step S302.

In the player setting at step S305, the player can switch as to practice is made by one player or two players. The set result is recorded in the item of the "Player" in the "Training option" of FIG. 6. In the "Repeat setting" at step S308, it is determined that the practice is to be suspended when it is completed once or to repeatedly be continued without suspending in accordance with the operation of the player. The set result is recorded in the item of the "Repeat" in the "Training option" of FIG. 6.

In the "Blank setting" at step S309, an interval at the time of repeating practice, namely a time interval from the end of one practice to the starting of a next practice is set within a predetermined range (for example, 1 through 10 seconds) in accordance with the instruction from the player. The set value is recorded in the item of the "Blank time" in the "Training option" of FIG. 6.

In the "Speed setting" at step S310, a tempo of the practice, namely, a moving speed of the timing marks 104 in the indicator 100 is set in accordance with an instruction from the player. The set speed is recorded in the item of the "Speed" in the "Training option" of FIG. 6. The set range of the "Speed" certainly includes the speed slower than a standard speed corresponding to the moving speed of the timing marks 104 when the BGM is reproduced at a regular or original speed. The set range may include the speed faster than the standard speed.

In the "BGM ON/OFF setting" at step S311, a decision is made as to whether or not the BGM is to be reproduced during the practice in accordance with an instruction from the player. In this process, when the BGM is set to "ON", namely the BGM reproduction is selected, the item of the "Speed" of FIG. 6 is set to the standard speed. Moreover, arbitrary time cannot be set in the "Blank time". In the "Check mark ON/OFF setting" at step S312, setting is done as to whether or not the judged result that the operation is good or bad is to be displayed on the indicator 101 when the controller 52 is operated during the practice in accordance with an instruction from the player. In the "Recording ON/OFF setting" at step S313, setting is made as to whether or not the operation during practice and the judged result that the operation is good or bad are to be recorded according to an instruction from the player. The set results at steps 311, S312 and S313 are recorded respectively on the items of the "BGM ON/OFF", "Check mark ON/OFF" and "Recording ON/OFF" in the "Training option" of FIG. 6.

Figure 16:
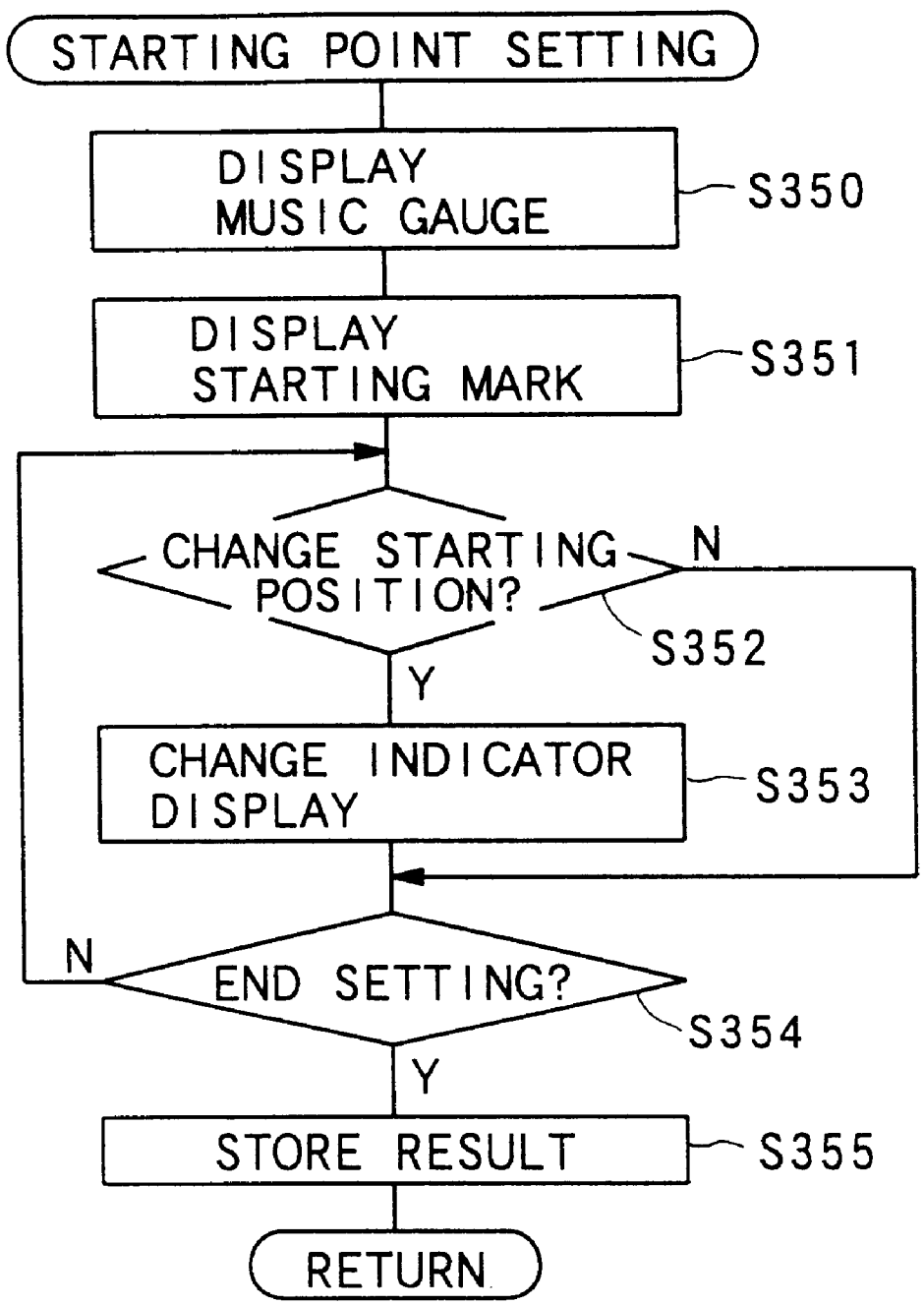
FIG. 16 is a flow chart showing processing steps in the case where starting point setting is selected in the process of FIG. 15.

The "starting point setting" at step S 306 an d the "End point setting" at step S307 are provided in order to set as to which positions of the BGM is to be practiced. As shown in FIG. 16, in the "Starting point setting", a music gauge 120 which extends in the up-and-down direction is display ed on an end portion of the main display area 110 (step S350). A lower end of the music gauge 120 has correspondence to the head of the BGM, and its upper end has correspondence to the tail of the BGM. After the music gauge 120 is displayed, the sequence goes to step S351 so that a starting point mark 121 which extends in a horizontal direction is displayed in a predetermined position of the indicator 101 (see FIG. 18). When the starting point mark 121 is displayed, the display range of the indicator 101 (see FIG. 2) is adjusted so that a phrase number recorded in the item of the "Starting point phrase number" of FIG. 6, namely, the delimiter line 107 corresponding to the practice starting position coincides with the starting point mark 121. As described with reference to FIG. 2, since the delimiter time per phrase is recorded in the score data so as to have correspondence to each phrase number, the delimiter time corresponding to the phrase number can be specified from the score data, and the score data in a necessary range can be read on a basis of the delimiter time to thereby realize the above mentioned adjusting of the display range. Moreover, a mark 122 representing the practice starting position in the entire music is displayed on the music gauge 120. The display position of the mark 122 can be specified by obtaining the delimiter time corresponding to the starting point phrase number similarly to the display control of the indicator 101.

At next step S352, a judgment is made as to whether or not the player changes the practice starting position. When the change is made, the starting phrase number is changed according to a changed content, and the display of the indicator 101 is changed so that the delimiter line 107 corresponding to the changed phrase number is superposed on the starting point mark 121 (step S353). Thereafter, a judgment is made as to whether or not the player instructs to stop the setting of the starting point phrase number (step S354), and when the instruction is not given, the sequence returns to step S352. When it is judged at step S352 that the starting position is not changed, the process of step S353 is omitted and the sequence goes to step S354. When it is judged at step S354 that the setting is to be ended, the starting point phrase number set at this time is recorded in the item of the "Starting point phrase number" in the data of FIG. 6, and the sequence returns to step S302 of FIG. 15.

Figure 17:
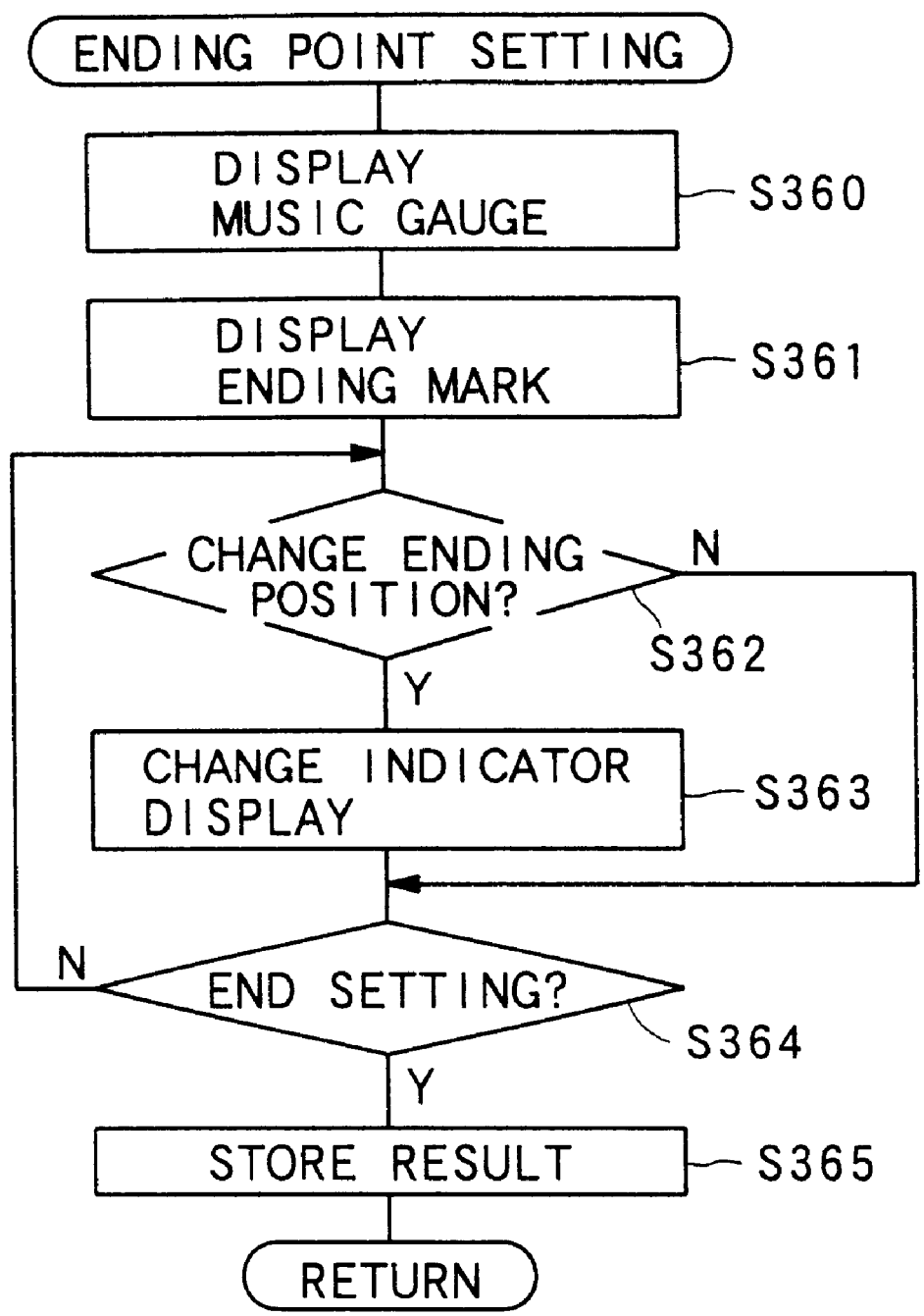
FIG. 17 is a flow chart showing processing steps in the case where end point setting is selected in the process of FIG. 15.

As shown in FIG. 17, in the ".End point setting" process, the music gauge 120 which extends in the up-and-down direction is displayed on the end portion of the main display area 110 (step S360). Then, an end point mark 123 which extends in the horizontal direction is displayed in a predetermined position of the indicator 101 (see FIG. 19). At this time, the display range of the indicator 101 (see FIG. 2) is adjusted in such a manner that the phrase number recorded in the item of the "End point phrase number" of FIG. 6, that is, the delimiter line 107 corresponding to the practice end position coincides with the end point mark 123. This adjustment is made according to a correspondence relationship between the phrase number and the time axis of the score data similarly to the case of adjusting the starting point.

Moreover, a mark 124 showing a practice range in the entire music is displayed on the music gauge 120. This display range is determined in accordance with a correspondence relationship between the phrase numbers recorded in the times of the "Starting point phrase number" and the "End point phrase number" of FIG. 6 and the time on the score data.

At next step S362, a judgment is made as to whether or not the player changes the practice end position. When the change is made, the end point phrase number is changed according to the changed content, and the display of the indicator 101 is changed so that the delimiter line 107 corresponding to the changed phrase number is superposed on the end point mark 123 (step S363). Thereafter, a judgment is made as to whether or not the player instructs to stop setting of the end point phrase number (step S364), and when the instruction is not given, the sequence returns to step S362. It is judged at step S362 that the end position is not changed, the step S363 is omitted and the sequence goes to step S364. When the ending of the setting is distinguished at step S364, the end point phrase number set at that time is recorded in the item of the "End point phrase number" in the data of FIG. 6, and the sequence returns to step S302 of FIG. 15.

In the case where the "Free-play" is selected in the play select process of FIG. 9, the starting point phrase number is fixed to a number of the head phrase in the BGM, and the end point phrase number is fixed to a number of the tail phrase in the BGM.

When the decision is made at step S303 of FIG. 15 that no selection is done, the sequence goes to step S314 so that a judgment is made as to whether or not the player performs ending operation of the training setting. When the ending operation is not performed, the sequence returns to step S302, and when the ending operation is performed, the training setting is ended and the sequence returns to step S20 of FIG. 7.

Figure 20:
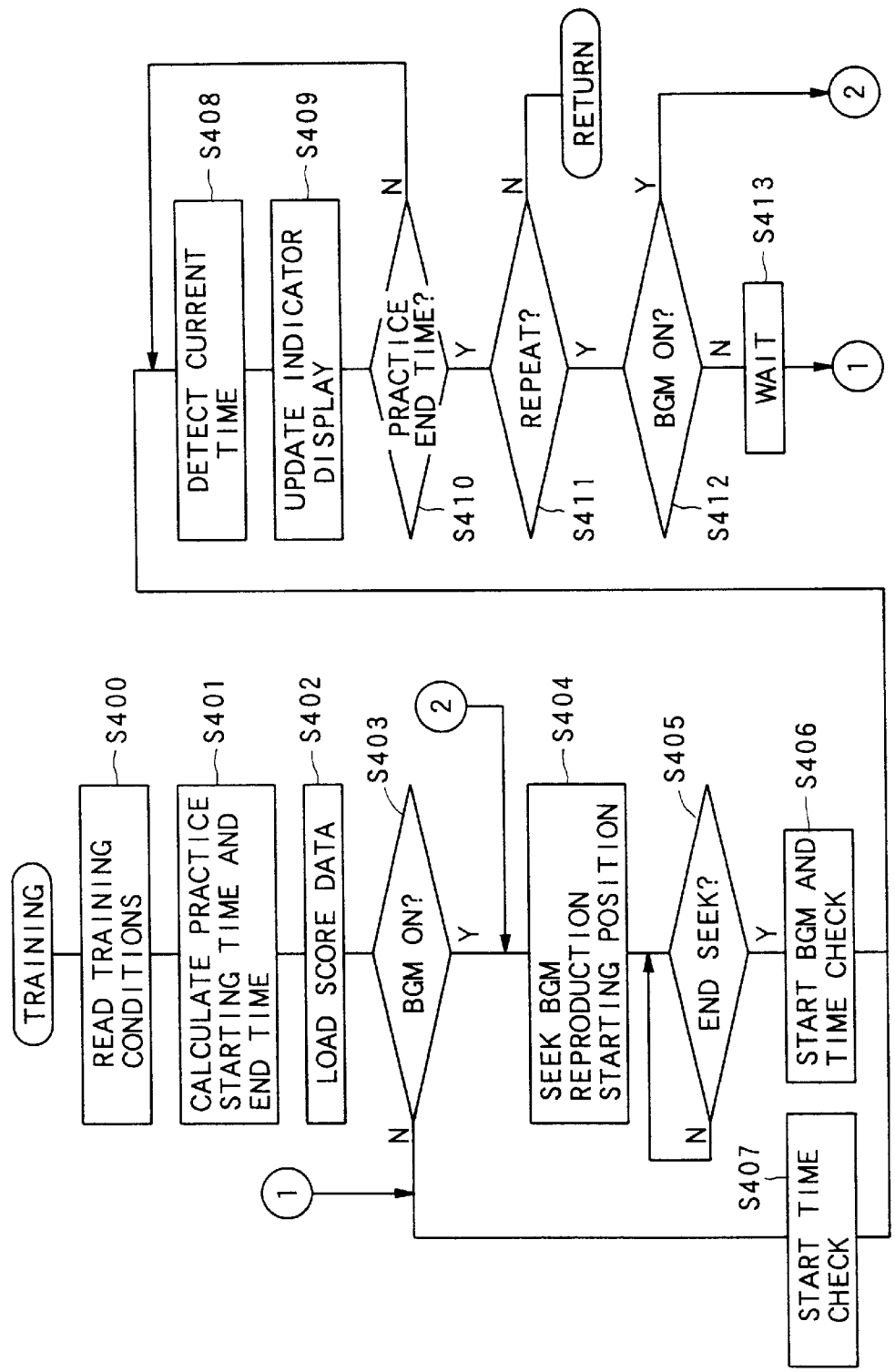
FIG. 20 is a flow chart showing processing steps in the case where training is selected in the process of FIG. 7.

FIG. 20 shows details of a training process (step S30 of FIG. 7). This process is for carrying out actual training (practice) in accordance with the data of FIG. 6. At the first step S400, data defining training conditions of FIG. 6 recorded in the main memory 13 are read. Then, the BGM which is selected currently is specified based on the data of the "BGM code", and time corresponding to the staring point phrase number and time corresponding to the end point phrase number are calculated with the play starting time of the BGM being as the reference (step S401). Thereafter, the score data corresponding to a range from the calculated practice starting time to the practice end time are read from the CD-ROM 44 and loaded into the main memory 13 (step S402). Then, the item of the "BGM ON/OFF" in the data of FIG. 6 is referred to and a judgment is made as to whether or not the reproduction of the BGM is set to "ON" (step S403).

When the BGM is "ON", the sequence goes to step S404 so that an instruction is given to the disk reading section 40 to seek a reproduction starting position of the BGM on the CD-ROM 44. Namely, the CPU 11 first specifies the BGM to be practiced based on the data stored in the item of the "BGM code", and specifies a storage position of the data corresponding to the practice starting time (time corresponding to the starting point phrase number) based on the time information included in the BGM data on the CD-ROM 44. Thereafter, a pick-up for reading a disk is moved to the storage position.

At next step S405, a judgment is made as to whether or not a signal representing the completion of seeking is outputted from the disk reading section 40, and when the completion of seeking is received, the disk reading section 40 is instructed to reproduce the BGM (step S406). Moreover, clocking of lapsed time of the game is started synchronously with the starting of the reproduction. The time clocking may be started on the basis that the game starting time is 0, but the time clocking may be started at time corresponding to the starting point phrase number. In the case where the time clocking is started at step S406, the time clocking proceeds with the same speed as that of the actual time. It is desired to adjust start timing of the time clocking in consideration of a time lag from timing of issuing the instruction for starting the reproduction to timing at which the BGM reproduction actually starts. After step S406 is completed, the sequence goes to step S408.

When the judgment is made at step S403 that the BGM is set to "OFF", the time clocking is started at step S407 and the sequence goes to step S408. The degree of progress in the time clocking in this case varies with a speed set in the item of the "Speed" of FIG. 6. For example, in the case where the speed is set to be slower than the standard speed, the time clocking speed is adjusted more slowly than the actual time as an amount of a deviation between the standard speed and the speed set in the item of the "Speed" becomes larger. Moreover, in the case where the process directly proceeds from the step S403 to step S407, the BGM is not reproduced.

At step S408, lapsed time from the starting of the time clocking at step S406 or S407 is detected as current time. Thereafter, the score data corresponding to the detected current time are read from the main memory 13, and the display of the indicator 101 is updated based on the read data (step S409). Further, at step S410, a judgment is made as to whether or not the detected current time coincides with or passes the practice end time, namely, time corresponding to the end point phrase number, and when the current time is before the practice end time, the sequence returns to step S408. When step 408 through step S410 are repeated, the display of the indicator 101 is updated every moment, and the timing marks 104 gradually descend within the indicator 101.

When it is decided at step S410 as the practice end time, the sequence goes to step S411 so that a judgment is made as to whether or not the "Repeat practice" in the item of the "Repeat" in the data of FIG. 6 is designated. When the "Repeat practice" is not designated, the training is ended and the sequence returns to step S20 of FIG. 7. On the other hand, when it is determined at step S411 of FIG. 20 that the "Repeat practice" is selected, the sequence goes to step S412 so that a judgment is made as to whether or not the "BGM ON" in the "BGM ON/OFF" of FIG. 6 is set. When the "BGM ON" is set, the sequence goes to step S404, and when not, goes to step S413. The process waits just for seconds set in the "Blank time" of FIG. 6 at step S413, and the sequence goes to step S407. Therefore, when an affirmative decision is made at step S411, namely, the "Repeat practice" is specified at step S308 of FIG. 15, the training is repeated. When the player performs a predetermined cancel operation on the controller 52, the repetition is canceled, and the sequence returns to step S20 of FIG. 7.

Figure 21:
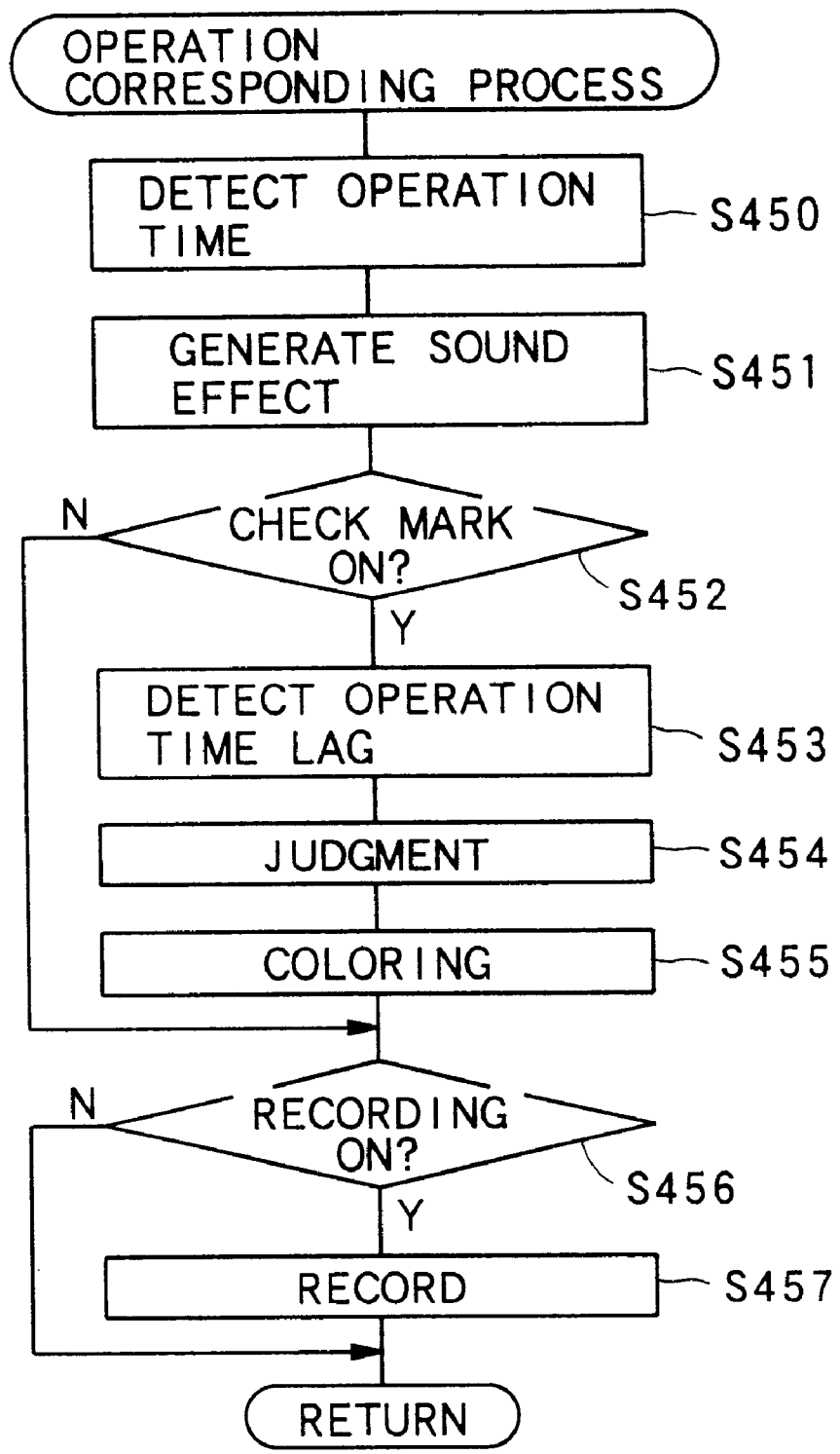
FIG. 21 is a flow chart showing processing steps to be executed in an interrupting manner when a predetermined direction operation is performed on a controller by a player during the process of FIG. 20.

While the process at steps S408 through S410 of FIG. 20 is repeated to allow the timing marks 104 to descend within the indicator 101, if the player operates one of the operation members having correspondence to any one of the tracks 102A through 102F on the controller 52, the CPU 11 executes an operation corresponding process of FIG. 21 in an interrupting manner.

In the process of FIG. 21, at step S450, the CPU 11 detects actual operation time at which the controller 52 is operated along the time clocking which is started at step S406 or S407 and generates a sound effect corresponding to the operation timing (see FIG. 2) on the score data closest to the detected actual operation time from the sound control section 30 (step S451). At step S452, a judgment is made as to whether or not the item of the "Check mark ON/OFF" is set to "ON", namely, the display of the check mark is requested. When the check mark is "ON", the actual operation time detected at step S450 is compared with the operation timing recorded on the score data so that a time lag between the actual operation time and the operating timing defined by the score data closest to the operated time is detected (step S453). This time lag is detected for the respective operation members corresponding to the tracks 102A through 102F of the indicator 101.

Thereafter, an appraisal judgment is made as to the operation is good or bad based on the degree of the detected time lag (step S454). The appraisal is made into plural levels (for example, four levels) according to the amount of the time lag, and as the time lag becomes smaller, the appraisal becomes higher. At the next step S455, display colors of the timing marks 104 of the indicator 101 corresponding to the operation timing for which the time lag detection is made are changed based on the appraised result.

At step S456, a judgment is made as to whether or not the item of the "Recording ON/OFF" is set to "ON", namely recording of the practiced results is specified. When it is set to "ON", the sequence goes to step S457 and the actual operation time of each operation member detected at step S450 stored in the main memory 13 so as to be associated with the appraised result. When it is determined at step S452 that the setting of the check mark is "OFF", steps S453 through S455 are omitted and the sequence goes to step S456. In this case, even if the sequence goes to step S457, no appraised result exists, and thus the recording is omitted. Therefore, only the actual operation time is stored so as to be associated with the respective operation members. After the recording is executed at step S457, the interruption process is completed and the sequence returns to the process of FIG. 20. When the negative judgment is made at step S456, the step S457 is omitted, and the sequence returns to the process of FIG. 20.

Figure 22:
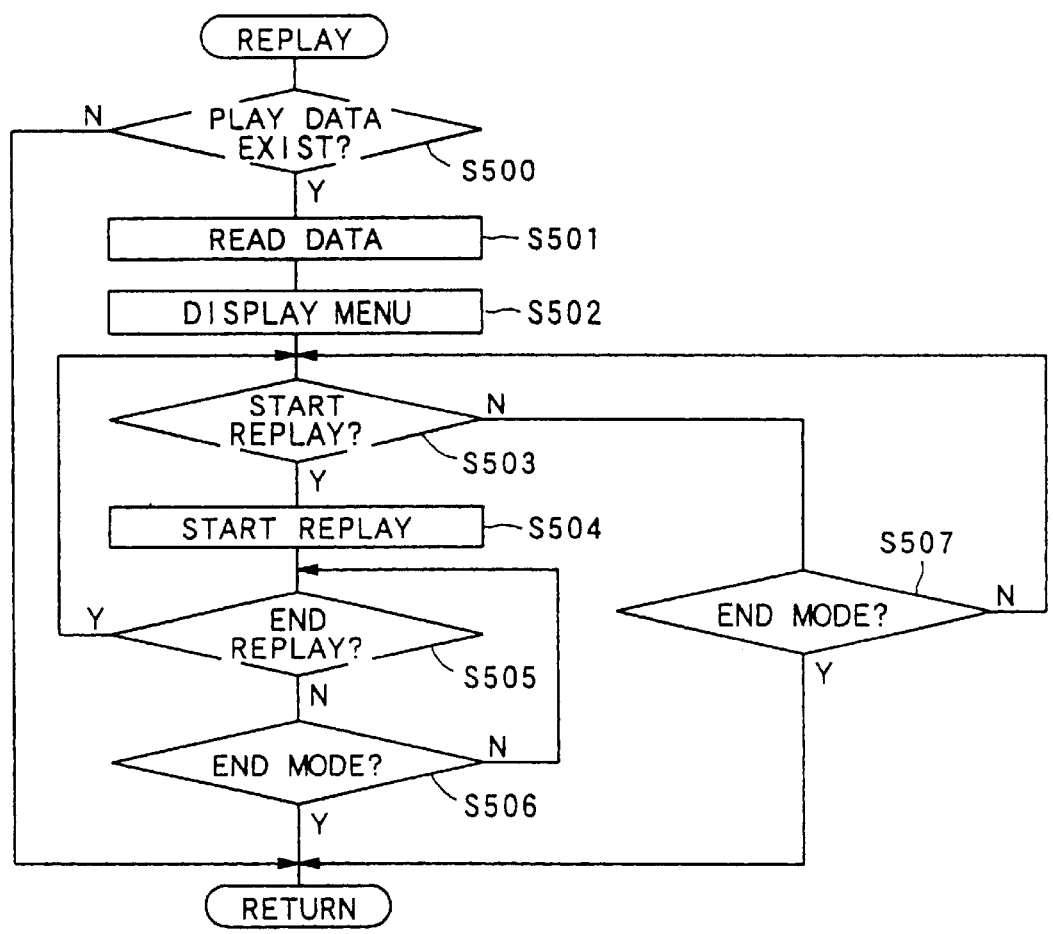
FIG. 22 is a flow chart showing processing steps in the case where replay is selected in the process of FIG. 7.
Figure 23:
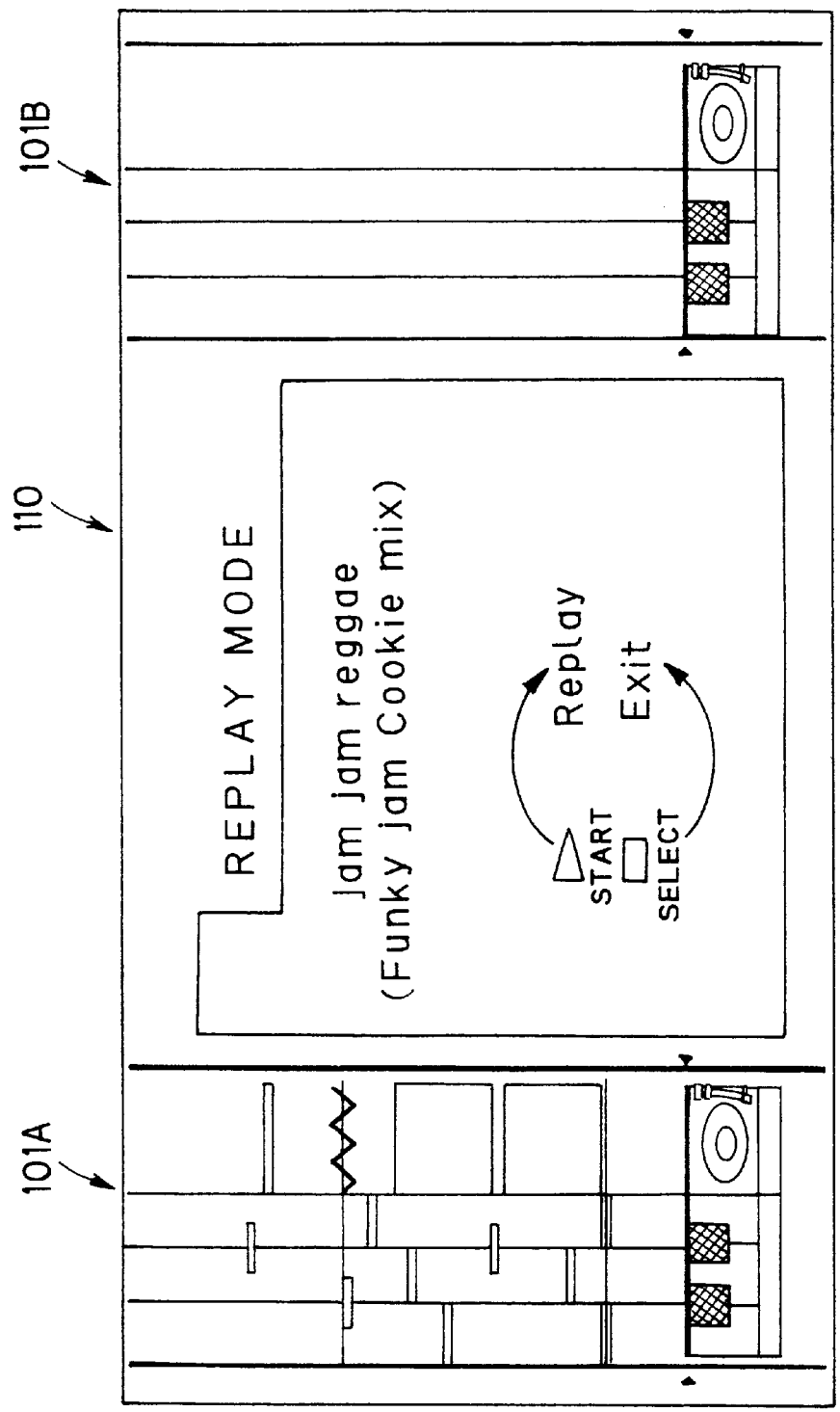
FIG. 23 is a diagram showing an example of a picture to be displayed in the case where the process of FIG. 22 is executed.

FIG. 22 shows details of a replay process (step S28 of FIG. 7). This process is executed in order to reproduce the contents recorded at step S457 of FIG. 21. First at step S500, a judgment is made as to whether or not replay data, namely the data recorded at step S457 of FIG. 21 exist, and when the data do not exist, the replay process is cancelled and the sequence returns to step S20 of FIG. 7. On the other hand, when the replay data exists, they are read (step S501) and a predetermined menu picture is displayed (step S502). As shown in FIG. 23, the menu picture is constituted to show the titles of the music to be replayed and a procedure for replay operation in the main display area 110.

After the menu is displayed, a judgment is made as to whether or not the player instructs the starting of replay (step S503), and when the instruction is given, the replay is started based on the replay data. During the replay, the display of the timing marks 104 on the indicator 101 and the reproduction of the BGM are controlled in the same manner as steps S400 through S410 of FIG. 20. When the actual operation time of the player recorded in the main memory 13 comes, the sound effect corresponding to the recorded operation is reproduced. Moreover, when the appraisal corresponding to the operation by the player is recorded, the color of the timing marks 104 is controlled to be changed according to the recorded appraisal.

After the replay is started, a judgment is made as to whether or not the replay is completed (step S505), and when the replay is not completed, a judgment is made as to whether or not the player performs an end operation to stop the replay mode (step S506). When the player does not perform the end operation, the sequence returns to step S505, and when the player performs the end operation, the replay is ended and the sequence returns to step S20 of FIG. 7. When it is determined at step S505 that the replay is ended, the sequence returns to step S503. When it is determined at step S503 that the starting of the replay is not instructed, a judgment is made as to whether or not the player performs an end operation to stop the replay mode (step S507). When the player does not perform the end operation, the sequence returns to step S503, and when the player performs the end operation, the replay is ended and the sequence returns to step S20 of FIG. 7.

Figure 24:
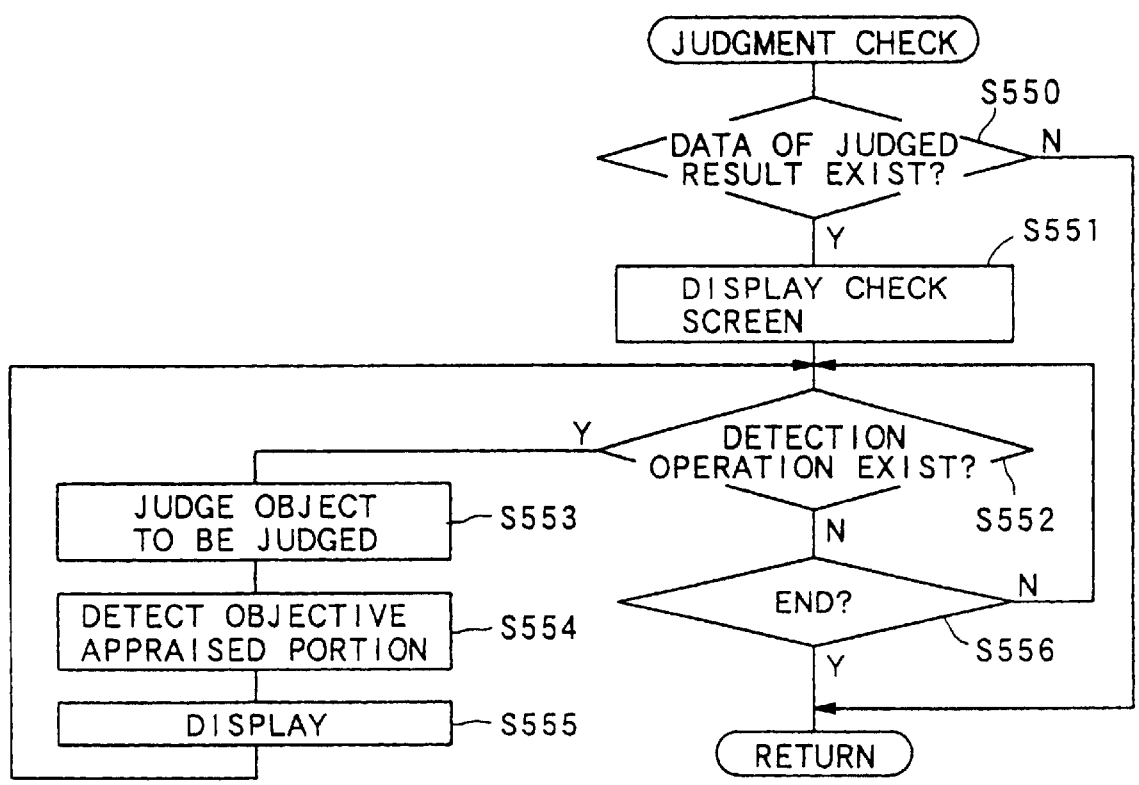
FIG. 24 is a flow chart showing processing steps in the case where a judgment check is selected in the process of FIG. 7.
Figure 25:
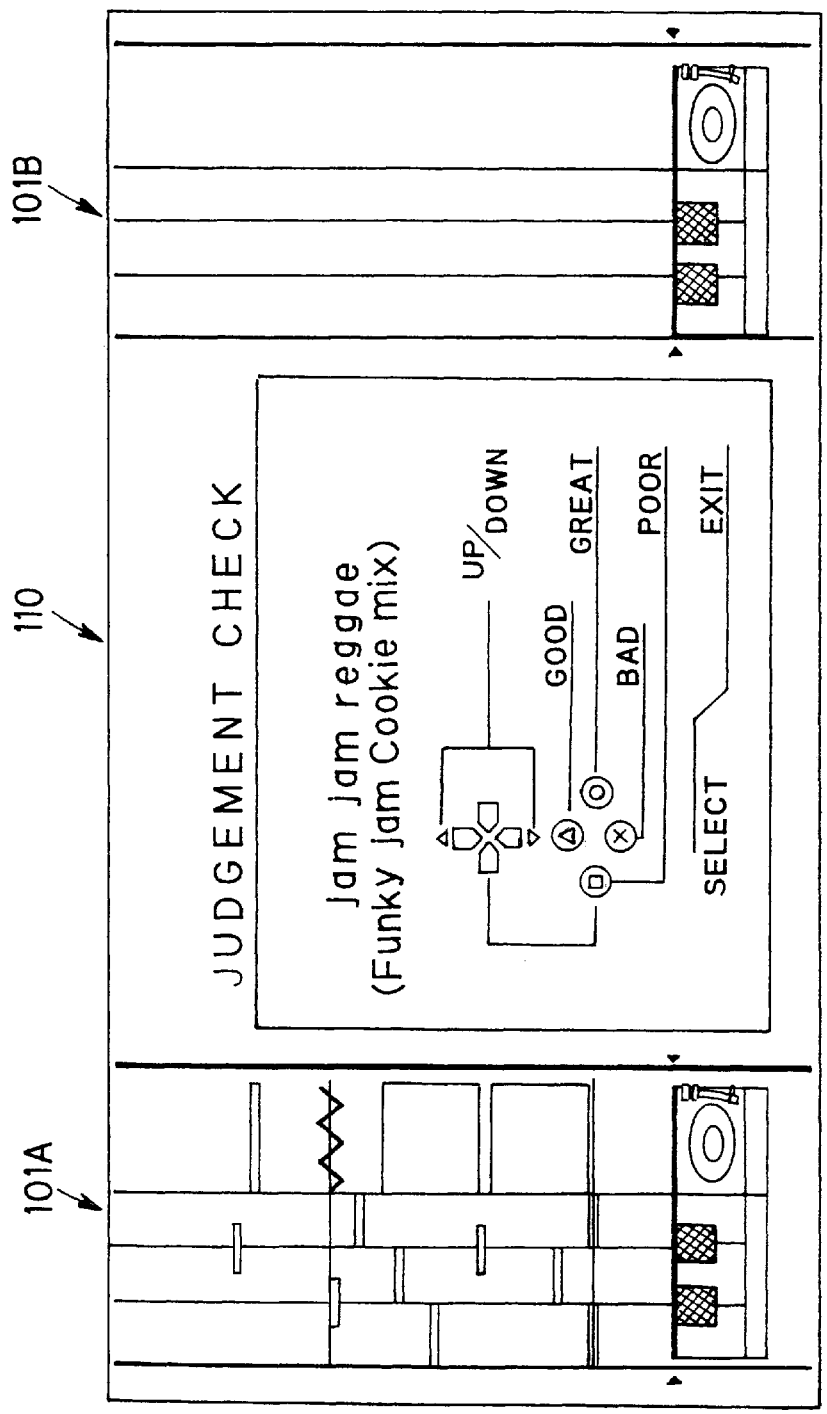
FIG. 25 is a diagram showing an example of a picture to be displayed in the case where the process of FIG. 24 is executed.

FIG. 24 shows details of a judgment check process (step S29 of FIG. 7). This process is executed in order to check the judged results recorded at step S457 of FIG. 21. First a judgment is made at step S550 as to whether or not the data on which the judged results are recorded exist, and when the data do not exist, the judgment check process is cancelled and the sequence returns to step S20 of FIG. 7. On the other hand, when the data exist, a predetermined check picture is displayed (step S551). On this check picture, as shown in FIG. 25, the titles of the music to be checked and a procedure for the check operation are displayed on the main display area 110.

After the check picture is displayed, a judgment is made as to whether or not the player performs a search operation (step S552). As mentioned above, the actual performing operation performed by the player is appraised into the plural levels in the process of FIG. 21. For this reason, also in the process of FIG. 24, different search commands are prepared for the respective levels of the judged results. More concretely, the judged results are divided into the four levels, that is, the "great", "good", "poor" and "bad", in the order of higher level of the results, and different search commands are prepared for the respective levels of the appraisal.

When it is determined at step S552 that the search operation is performed, a judgment is made as to which judged result is detected (step S553). Then the CPU 11 carries out the search of the data in which the judged results are recorded, and extracts the actual performing operation which is recorded in association with the objective judged result (step S554). For example, in the case where the player instructs to detect a part appraised as "good", the judged results are detected so that the performing operation appraised as "good" is extracted. Then, the score data in a predetermined range are read according to the extracted actual operation time, and the timing marks 104 corresponding to this range are displayed on the indicator 101 (step S555). After the display, the sequence returns to step S552. When the player repeats the detection, a portion which is judged as "good" or "bad" in the player's operations is found so that the found portions can be referred for future practice.

When the detection is not performed at step S552, a judgment is made as to whether or not the player instructs to stop the judgment check (step S556), and when the instruction is not given, the sequence returns to step S552. When the end is instructed, the sequence returns to step S20 of FIG. 7.

Figure 27:
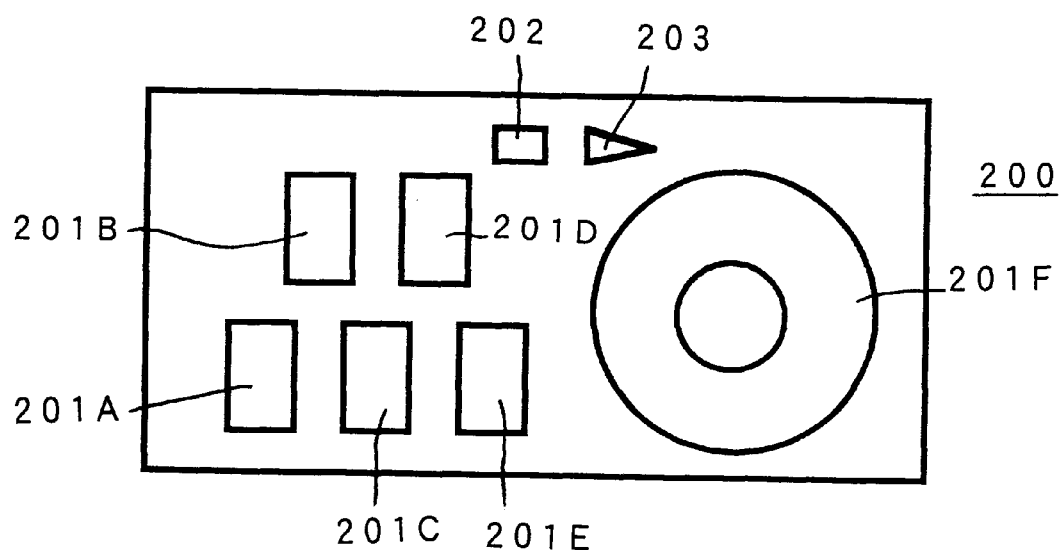
FIG. 27 is a diagram showing another example of the controller which can be used in the game system of FIG. 1.

FIG. 27 shows a modification of the controller. This controller 200 includes five push-button switches 201A through 201E as the operation members for performing a rendering operation during a game arranged similarly to the icons 106A through 106E at the lower end of the indicator 101, and a disk-shaped operation member 201F arranged on the right side of the switches. The operation member 201F can be rotated about its center portion. When at least one of the operation members 201A through 201E is depressed, a signal corresponding to the operation is outputted, and when the operation member 201F is rotated, a signal corresponding to the operation, for example, a signal associated with a rotational direction and a rotation amount is outputted. Here, a select button 202 and a start button 203 are provided on an upper portion of the controller 200. They are push-button type switches and are operated to select a game or the like.

In the case where such a controller 200 is used, a corresponding relationship between the tracks 102A through 102F of the indicator 101 and the operation members 201A through 201F is clarified, and the operability of a game is advantageously improved.

In the above embodiments, the CD-ROM 44 serves as the storage device and the storage medium, the controller 52 serves as the operation input device, and the disk reading section 40 and the sound control section 30 serve as the reproduction device. Moreover, the CPU 11 in combination with the particular software serves as the performing operation instructing device, practice instructing device, instructing device, practice range setting device, reproduction range setting device, blank setting device, tempo setting device, reproduction setting device, reproduction halt device, operation recording device, replay device, appraisal device and appraisal display device. However, at least some of the above devices may be replaced by logic circuits utilizing LSI or the like.

As mentioned above, according to the present invention, since a practice range is set in one portion of music and the game system instructs a player to perform the rendering operation in this range, the player can practice the desired range intensively, and thus a practice mode which is suitable for the practice of music can be provided. In the case where a tempo with which the rendering operation is instructed is changed, more various practices can be made, and in the case where the rendering operations are recorded so as to be associated with their appraisals to thereby reproduce them, the player can appraise his or her rendering operation objectively. Further, in the case where a portion to which a specified appraisal was given can be retrieved from the data of the recorded rendering operations, the player can more easily check an appraisal of his or her rendering operation and thus can make a practice efficiently.

What is claimed is:

1. A game system, comprising:
   a storage device which stores data for reproducing music and data which define a performing procedure corresponding to the music;
   a display;
   an operation input device for receiving an operation of a player;
   a reproduction device for reproducing the music based on the data for reproducing the music;
   a performing operation instructing device for instructing the player through the display to do performing operations associated with reproduction of the music onto the operation input device based on the data which define the performing procedure;
   a practice range setting device for setting a practice range on at least one portion of the music according to an instruction from the player;

practice instructing device for instructing the player through the display to practice the performing operations included in the practice range based on data corresponding to the practice range set through the practice range setting device in the data which define the performing procedure;

an appraisal device for appraising the performing operations into plural levels every time the player performs a performing operation based on a correspondence relationship between the performing operations, which are inputted through the operation input device by the player in response to the performing operation instructing device and the practice instructing device, and the data which define the performing procedure;

an appraisal display device for displaying, through the display, appraised results of the appraisal device to the player;

an operation recording device for recording the performing operations inputted through the operation input device by the player in response to the practice instructing device, and appraised results of the appraisal device; and a replay device for replaying the recorded performing operations together with the appraised results thereto, wherein said performing operation instructing device and said practice instructing device control the display to display an indicator having at least one track extending in a predetermined direction, and display instruction marks, for showing operation timing of the operation input device, in the indicator based on the data which define the performing procedure such that the instruction marks move along the at least one track and reach an operating position, set at a stationary position on the track, when the operation timing for executing each of the instruction marks has come, wherein said appraisal device appraises each of the performing operations based on a time lag between an actual operation time, at which the player executes to the instruction mark produced by the performing operation instructing device or the practice instructing device, and the operation timing defined by the data of the performing procedure, and wherein said game system is provided with a detection device for allowing the player to search data of the performing operations recorded by the operation recording device so as to detect a portion to which an appraisal of a certain level is given.

2. The game system according to claim 1, further comprising:

a repetition setting device for setting as to whether or not a sequence of the performing operations included in the practice range is to be repeatedly practiced, wherein when a repetition of the sequence of the performing operations is set, the practice instructing device repeatedly instructs the sequence of the performing operations corresponding to the practice range.

3. The game system according to claim 2, further comprising:

a blank setting device for setting blank time in case that the sequence of the performing operations included in the practice range is repeatedly instructed, wherein the practice instructing device changes an interval from an end of each sequence of the performing operations to a start of a next sequence of the performing operations based on the blank time set by the blank set device.

4. The game system according to claim 1, further comprising:

a tempo setting device for setting a tempo with which the practice instructing device instructs the performance operations in accordance with an instruction from a player, wherein the practice instructing device changes the tempo with which the performing operations are instructed based on a set result by the tempo setting device.

5. The game system according to claim 4, wherein the tempo produced by the practice instructing device is slower than a tempo with which the performing operation instructing device instructs the performing operations.

6. The game system according to claim 1, further comprising:

a reproduction setting device for setting as to whether or not the music is to be reproduced by the reproduction device according to an instruction from the player; and a reproduction halt device for halting reproduction of the music while the practice instructing device instructs the performing operations, when the reproduction of the music is negated by the reproduction setting device.

7. A game system, comprising:

a storage device for storing data for reproducing music and data which define a performing procedure of the music;

an operation input device for receiving an operation of a player;

a reproduction range setting device for setting a reproduction range on at least one portion of the music according to an instruction from the player;

an instructing device for instructing the player to do performing operations included in the reproduction range based on data corresponding to the reproduction range set by the reproduction range setting device in the data which define the performing procedure;

an appraisal device for appraising the performing operations into plural levels every time the player performs a performing operation based on a correspondence relationship between the performing operations, which are inputted through the operation input device by the player in response to the instructing device and the data which define the performing procedure;

an operation recording device for recording the performing operations inputted through the operation input device by the player in response to the instructing device and appraised results of the performing operations by the appraisal device;

a replay device for replaying the recorded performing operations together with the appraised results thereto; and a detection device for allowing the player to search data of the performing operations recorded by the operation recording device so as to detect a portion to which an appraisal of a certain level is given.

8. A storage medium which stores data for reproducing music, data which define a performing procedure corresponding to the music and a program for executing a predetermined music performance game based on the performing procedure and the music, the program being executable by a computer to allow the computer to serve as:

a reproduction device for reproducing the music based on the data for reproducing the music;

a performing operation instructing device for instructing the player through a display to do performing operations, associated with reproduction of the music, on an operation input device based on the data which define the performing procedure;

a practice range setting device for setting a practice range on at least one portion of the music according to an instruction from the player;

a practice instructing device for instructing the player through the display to practice the performing operations included in the practice range based on data corresponding to the practice range set through the practice range setting device in the data which define the performing procedure;

an appraisal device for appraising the performing operations into plural levels every time the player performs a performing operation based on a correspondence relationship between the performing operations, which are inputted through the operation input device by the player in response to the performing operation instructing device and the practice instructing device, and the data which define the performing procedure;

an appraisal display device for displaying, through the display, appraised results of the appraisal device to the player;

an operation recording device for recording the performing operations inputted through the operation input device by the player in response to the practice instructing device, and appraised results of the appraisal device; and a replay device for replaying the recorded performing operations together with the appraised results thereto, wherein said performing operation instructing device and said practice instructing device control the display to display an indicator having at least one track extending in a predetermined direction, and display instruction marks, showing operation timing of the operation input device, in the indicator based on the data which define the performing procedure such that the instruction marks move along the at least one track and reach an operating position, fixed at a stationary position on the track, when the operation timing for executing each of the instruction marks has come, wherein said appraisal device appraises each of the performing operations based on a time lag between an actual operation time, at which the player executes to the instruction mark produced by the performing operation instructing device or the practice instructing device, and the operation timing defined by the data of the performing procedure, and wherein said program allows the computer to further serve as a detection device for allowing the player to search data of the performing operations recorded by the operation recording device so as to detect a portion to which an appraisal of a certain level is given.

9. A storage medium which stores data for reproducing music, data which define a performing procedure corresponding to the music and a program for executing a predetermined music performance game based on the performing procedure and the music, the program being executable by a computer to allow the computer to execute the steps of:

setting a reproduction range in at least one portion of the music according to an instruction from a player;

instructing the player to do performing operations included in the reproduction range based on data corresponding to the set reproduction range in the data which define the performing procedure;

appraising the performing operations into plural levels every time the player performs a performing operation based on a correspondence relationship between the performing operations inputted through an operation input device of a game system by the player in response to an instruction issued in said step of instructing and the data which define the performing procedure;

recording the performing generations inputted by the player in response to the instruction issued in said step of instructing and appraised results given to each of the performing operations;

replaying the recorded performing operations together with the appraised results given to each of the performing operations; and allowing the player to search data of the performing operations recorded in said step of recoding so as to detect a portion to which an appraisal of a certain level is given.

* * * * *